(12) United States Patent
Lummerstorfer et al.

(10) Patent No.: US 11,492,473 B2
(45) Date of Patent: Nov. 8, 2022

(54) REINFORCED POLYMER COMPOSITION

(71) Applicant: BOREALIS AG, Vienna (AT)

(72) Inventors: Thomas Lummerstorfer, Linz (AT); Michael Tranninger, Kematen an der Krems (AT)

(73) Assignee: BOREALIS AG, Vienna (AT)

( * ) Notice: Subject to any disclaimer, the term of this patent is extended or adjusted under 35 U.S.C. 154(b) by 285 days.

(21) Appl. No.: 16/646,972

(22) PCT Filed: Sep. 26, 2018

(86) PCT No.: PCT/EP2018/076111
§ 371 (c)(1),
(2) Date: Mar. 12, 2020

(87) PCT Pub. No.: WO2019/063606
PCT Pub. Date: Apr. 4, 2019

(65) Prior Publication Data
US 2020/0216652 A1 Jul. 9, 2020

(30) Foreign Application Priority Data

Sep. 29, 2017 (EP) .................. 17194161

(51) Int. Cl.
| | | |
|---|---|---|
| C08L 23/12 | (2006.01) | |
| C08J 5/04 | (2006.01) | |
| C08L 23/06 | (2006.01) | |
| C08K 3/04 | (2006.01) | |
| C08K 7/06 | (2006.01) | |

(52) U.S. Cl.
CPC .............. *C08L 23/12* (2013.01); *C08J 5/042* (2013.01); *C08L 23/06* (2013.01); *C08K 3/04* (2013.01); *C08K 7/06* (2013.01); *C08L 2207/02* (2013.01)

(58) Field of Classification Search
CPC ................................ C08L 51/06; C08L 23/12
See application file for complete search history.

(56) References Cited

U.S. PATENT DOCUMENTS

| | | | | |
|---|---|---|---|---|
| 4,863,790 A * | 9/1989 | Horacek | ............... | C08L 23/10 442/388 |
| 2004/0126554 A1 | 7/2004 | Kitano et al. | | |
| 2012/0238688 A1 | 9/2012 | Iwashita et al. | | |
| 2015/0315371 A1* | 11/2015 | Okunaka | ............... | B29C 48/05 525/240 |
| 2019/0169411 A1* | 6/2019 | Hablot | ............... | C08L 23/16 |

FOREIGN PATENT DOCUMENTS

| | | |
|---|---|---|
| CN | 105358622 A | 2/2016 |
| EP | 3095818 | 11/2016 |
| EP | 3095818 A1 | 11/2016 |
| EP | 3095819 | 11/2016 |
| EP | 3095819 A1 | 11/2016 |
| EP | 3095820 | 11/2016 |
| EP | 3095820 A1 | 11/2016 |
| EP | 3118249 | 1/2017 |
| EP | 3118249 A1 | 1/2017 |
| JP | 2002212364 A | 7/2002 |
| JP | 2010168526 A | 8/2010 |
| JP | 2017/0179277 A | 10/2017 |
| WO | 99/24478 A1 | 5/1999 |
| WO | 99/24479 A1 | 5/1999 |
| WO | 00/68315 A1 | 11/2000 |
| WO | 2010/149529 A1 | 12/2010 |
| WO | 2014/084314 A1 | 6/2014 |

OTHER PUBLICATIONS

Busico, et al., "Microstructure of polypropylene", Prog. Polym. Sci. 26 (2000), pp. 443-533.
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, 28, 1128-1134.
Busico, et al., "Full Assignment of the 13C NMR Spectra of Regioregular Polypropylenes: Methyl and Methylene Region", Macromolecules 1997, 30, 6251-6263.
H.N. Cheng, I3C NMR Analysis of Ethylene-Propylene Rubbers, Macromolecules 1984, 17, 1950-1955.
Zweifel, et al., "Plastics Additives Handbook", 6th Edition, Department of Materials, Institute of Polymers, 2009, pp. 1141-1190.
Zweifel, et al., "Plastics Additives Handbook", 5th Edition, Department of Materials, Institute of Polymers, 2001.
Resconi, et. al., "Selectivity in Propene Polymerization with Metallocene Catalysts", Chem. Rev. 2000, 100, 1253-1345.
Frank, et al., "GS-VIII : OP18 New Measurement Method for Appearance of Flow Marks or Tiger Stripes Defect for Improved Quantification and Analysis", pp. 25, Mar. 15, 2009.
Wang et al., "Structural Analysis of Ethylene/Propylene Copolymers Synthesized with a Constrained Geometry Catalyst", Macromolecules 2000, 33, pp. 1157-1162.
Zhou et al., "A new decoupling method for accurate quantification of polyethylene copolymer composition and triad sequence distribution with 13C NMR", Journal of Magnetic Resonance 187 (2007) pp. 225-233.
Zweifel, et al. "Plastics Additives Handbook 5th Edition".
Zweifel, et al., "Plastics Additives Handbook 6th Edition".
DAPLEN EG066AI Datasheet "Polypropylene" Supplied by Borealis AG.

(Continued)

*Primary Examiner* — Jeffrey C Mullis
(74) *Attorney, Agent, or Firm* — Tarolli, Sundheim, Covell & Tummino LLP (57) ABSTRACT

Reinforced polymer composition comprising a polypropylene (PP), a polar modified polypropylene (PMP) and carbon fibers (CF).

12 Claims, 2 Drawing Sheets

(56) References Cited

OTHER PUBLICATIONS

ISO 294-1 "Plastics—Injection moulding of test specimens of thermoplastic materials—Part 1: General principles, and moulding of multipurpose and bar test specimens" (1996).
IRGAFOS168FF, CAS # 31570-04-4.
ISO 527-2: Tensile testing for Plastics "The Definitive Guide to Performing ISO 527-2 Tensile Testing on Plastics".
ISO 178 "Plastics—Determination of flexural properties" (2019).
ISO 75-2 "Plastics—Determination of temperature of deflection under load—Part 2: Plastics and ebonite" (2013).
ISO 179-1 "Plastics—Determination of Charpy impact properties—Part 1: Non-instrumented impact test" (2010).
HJ20UB "Fibremod—Fibre reinforced polypropylene for light, integrated, high performing solutions".
ISO 1133-1 Plastics—Determination of the melt mass-flow rate (MFR) and melt volume-flow rate (MVR) of thermoplastics (2011).
Borflow HL504FB Datasheet "Polypropylene Homopolymer" Supplied by Borealis AG.
ISO 11357-3 "Plastics—Differential scanning calorimetry (DSC)" (2018).
ISO 10618 "Carbon fibre—Determination of tensile propreties of resin-impregnated yarn" (2004).
ISO 1873-2 "Plastics—Polypropylene (PP) moulding and extrusion materials—Part 2: Preparation of test specimens and determination of properties" (2007).
ISO/DIS 1628-1 "Plastics—Determination of the viscosity of polymers in dilute solution using capillary viscometers".
ISO 172/1eA "Charpy impact Test".
ISO 1888 "Textile glass—Staple fibres or filaments—Determination of average diameter" (2006).
ISO 1872-2 "Plastics—Polyethylene (PE) moulding and extrusion materials—Part 2: Preparation of test specimens and determination of properties" (2007).
ISO 1183-1 "Plastics—Methods for determining the density of non-ceilular plastics" (2019).
ISO 16152 "Plastics—Determination of xylene-soluble matter in polypropylene" (2005).
SSCONA TSPP 10213 GB "Modifier to improve the mechanical properties and adhesion of filler, glass fiber, carbon fiber and natural fiber compounds as well as one packs in polypropylene" Datasheet (May 2017).
Wang et al., "Structural Analysis of Ethylene/Propylene Copolymers Synthesized iwth a Constrained Geometry Catalyst" Macromolecules 2000, 22, 1157-1162.
Jenkins, et al., "Glossary of Basic Terms in Polymer Science" Pure & Appl. Chem., vol. 68, No. 12, pp. 2287-2311 (1996).
Queo 8230 Datasheet "Ethylene-based Plastomer" Supplied by Borealis AG.
Queo 8201 Datasheet "Ethylene-based Plastomer" Supplied by Borealis AG.
Japanese Patent Application No. 2020-508551; Notice of Reasons for Rejection dated Feb. 16, 2021; 8 pgs.
Yuan Liu, et al.; "Effect of Carbon Fiber Surface Treatment on Properties of Reinforced Polypropylene Thermoplastic Composites"; Shanghai Jiao Tong University, College of Chemistry and Chemical Engineering; 3 pgs.
Marcaniková, Lucie, et al.; "Rheological Behavior of Composites Based on Carbon Fibers Recycled from Aircraft Waste." AIP Conference Proceedings. vol. 1152. No. 1. American Institute of Physics, 2009; 15 pgs.

\* cited by examiner

REINFORCED POLYMER COMPOSITION

The present invention is directed at a reinforced polymer composition comprising a polypropylene (PP), a polar modified polypropylene (PMP) and carbon fibers (CF). Furthermore, the present invention is directed at an article comprising the reinforced polymer composition.

Reinforced polymer compositions are widely used. However in addition to the requirements of mechanical and optical properties, light weight has become an important requirement for many applications. In general there are two possibilities to support these requirements, namely one decreases the density of the material or one increases the material stiffness. As regards the stiffness increase, it can be generally obtained by adding fibers as reinforcing material into the polymer. For example, glass fibers are widely used as reinforcing material because of their good processability, excellent properties and low price. Also, carbon fibers are well known as reinforcing material because of their low density in combination with high stiffness. Nevertheless, the addition of fibers as reinforcing material typically results in an overall increase of density and result in inferior optical properties, such that a sufficient light weight material having well-balanced mechanical and optical properties is only difficult to obtain. Furthermore, in order to increase efficiency of subsequent processing it is desirable to lower the viscosity and injection pressure of the reinforced polymer composition. EP3095819 describes compositions also containing carbon fibers not having rather low tensile moduli. EP 3095818 is concerned with a carbon fiber composite of limited melt flow rate and limited impact-stiffness balance. EP3095820 discloses carbon fiber containing compositions having limited impact strength-tensile elongation at break balance. US2012/0238688 is also concerned with carbon fiber containing compositions.

Accordingly, the industries seek for a composite material fulfilling the demanding requirements of well-balanced mechanical and optical properties, in particular stiffness and impact resistance with reduced surface defects, which are known as flow marks, tiger stripes or flow lines, at light weight in combination with a low viscosity.

The finding of the present invention is to use a specific polypropylene, in combination with a polar modified polypropylene and carbon fibers in order to achieve well-balanced mechanical and optical properties, in particular stiffness and impact resistance with reduced surface defects, which are known as flow marks, tiger stripes or flow lines at light weight in combination with a low viscosity.

In a first aspect a polymer composition (PC) is described having
- a melt flow rate $MFR_2$ (230° C., 2.16 kg) measured according to ISO 1133 in the range of 20 to 30 g/10 min,
- a tensile modulus measured according to ISO 527-2 in the range of 8500 to 11500 MPa,
- a Charpy Impact Strength measured according to ISO 179-1 eU:2000 at 23° C. in the range of 30 to 50 kJ/m² and
- a tensile elongation at break measured according to ISO 527-2 in the range of 2.0 to 5.0%, the polymer composition (PC) comprising (a) 55 to 95 parts per weight of a polypropylene composition (PP);
(b) 2.5 to 10 parts per weight of a polar modified polypropylene (PMP);
(c) 2.5 to 35 parts per weight of carbon fibers (CF);

wherein the parts by weight are based on the total parts by weight of compounds (a), (b) and (c).

The polypropylene composition (PP) may comprise
(a) a first propylene homopolymer (PPH-1);
and/or
(b) a second propylene homopolymer (PPH-2);
and/or
(c) and a third propylene homopolymer (PPH-3);
wherein the first propylene homopolymer (PPH-1), the second propylene homopolymer (PPH-2) and the third propylene homopolymer (PPH-3) differ from each other in their melt flow rate MFR2 (230° C., 2.16 kg load).

The propylene homopolymer (HPP-1) may have a melt flow rate $MFR_2$ (230° C., 2.16 kg) measured according to ISO 1133 in the range of 1.0 to 45 g/10 min.

The propylene homopolymer (HPP-2) may have a melt flow rate $MFR_2$ (230° C., 2.16 kg) measured according to ISO 1133 in the range of 50 to 190 g/10 min.

The propylene homopolymer (HPP-3) may have a melt flow rate $MFR_2$ (230° C., 2.16 kg) measured according to ISO 1133 in the range of 200 to 800 g/10 min.

In one embodiment the polypropylene composition (PP) may comprise:
(a1) 2.5 to 22.5 parts per weight of the propylene homopolymer (HPP-1);
(a2) 55 to 95 parts per weight of the propylene homopolymer (HPP-2); and
(a3) 2.5 to 22.5 parts per weight of the propylene homopolymer (HPP-3);
based on the total parts by weight of compounds (a1), (a2) and (a3).

The polypropylene composition (PP) may additionally comprise a random ethylene copolymer (RPE).

In one embodiment the polypropylene composition (PP) may comprise:
(b1) 6 to 19 parts per weight of the propylene homopolymer (HPP-1);
(b2) 43 to 85 parts per weight of the propylene homopolymer (HPP-2);
(b3) 6 to 19 parts per weight of the propylene homopolymer (HPP-3); and
(b4) 6 to 19 parts per weight of the random ethylene copolymers (RPE);
based on the total parts by weight of compounds (b1), (b2), (b3) and (b4).

The polypropylene composition (PP) may additionally comprise a heterophasic propylene copolymer (HECO).

In one embodiment the polypropylene composition (PP) may comprise:
(c1) 5 to 25 parts per weight of the propylene homopolymer (HPP-1);
(c2) 15 to 50 parts per weight of the propylene homopolymer (HPP-2);
(c3) 5 to 25 parts per weight of the propylene homopolymer (HPP-3); and
(c4) 20 to 60 parts per weight of the heterophasic propylene copolymer (HECO);
based on the total parts by weight of compounds (b1), (b2), (b3) and (b4).

Polymer composition (PC) may comprise the polypropylene (PP) in an amount of at least 55 wt.-%, based on the total weight of the polymer composition (PC).

The polymer composition (PC) may comprise the polar modified polypropylene (PMP) in an amount of at least 2.5 wt.-%, based on the total weight of the polymer composition (PC).

The polymer composition (PC) may comprise the polymer composition (PC) comprises the carbon fibers (CF) in an amount of at least 2.5 wt.-%, based on the total weight of the polymer composition (PC).

The polymer composition (PC) may comprise the polypropylene (PP) and the polar modified polypropylene (PMP) are comprised in an amount of at least 57.5 wt.-%, preferably in an amount of at least 66 wt.-%, more preferably in an amount of at least 68 wt.-%, even more preferably in an amount of at least 75 wt.-% based on the total weight of the polymer composition (PC).

The polymer composition (PC) may comprise the polypropylene (PP), the polar modified polypropylene (PMP) and the carbon fibers (CF) in an amount of at least 60 wt.-%, preferably in an amount of at least 71 wt.-%, more preferably in an amount of at least 79 wt.-%, even more preferably in an amount of at least 89 wt.-%, based on the total weight of the polymer composition (PC).

The polymer composition (PC) may further have
(a) a tensile strength measured according to ISO 527-2 of at least 60 MPa
and/or
(b) a flexural modulus measured according to ISO 178 of at least 5000 MPa.

In one embodiment the polymer composition (PC) does not comprise
(a) any other fibers besides the carbon fibers (CF);
and/or
(b) any other polymers besides the polypropylene (PP) and the polar modified polypropylene (PMP).

In one embodiment the polymer composition (PC) does not comprise any other polymer besides the propylene homopolymer (HPP-1), the propylene homopolymer (HPP-2) and the propylene homopolymer (HPP-3).

In one embodiment the polymer composition (PC) does not comprise any other polymer besides the propylene homopolymer (HPP-1), the propylene homopolymer (HPP-2), the propylene homopolymer (HPP-3) and the elastomeric copolymer (E).

In one embodiment the polymer composition (PC) does not comprise any other polymer besides the propylene homopolymer (HPP-1), the propylene homopolymer (HPP-2), the propylene homopolymer (HPP-3) and the heterophasic propylene copolymer (HECO).

A second aspect is directed at an article comprising a polymer composition (PC) according to the first aspect.

THE POLYMER COMPOSITION (PC)

The present invention is directed at a polymer composition (PC) comprising a polypropylene composition (PP), a polar modified polypropylene (PMP) and carbon fibers (CF).

The polymer composition (PC) may comprise
(a) the polypropylene composition (PP) in an amount in the range of 55 to 95 parts per weight, preferably in the range of 63 to 92 parts per weight, more preferably in the range of 65 to 87 parts by weight;
and/or
(b) the polar modified polypropylene (PMP) in an amount in the range of 2.5 to 10 parts per weight, preferably in the range of 3.0 to 7.0 parts per weight, more preferably in the range of 3.0 to 6.0 parts per weight;
and/or
(c) the carbon fibers (CF) in an amount in the range of 2.5 to 35 parts per weight, preferably in the range of 5.0 to 30 parts per weight, more preferably in the range of 10 to 29 parts per weight;
based on the total parts by weight of the polypropylene (PP), the polar modified polypropylene (PMP) and the carbon fibers (CF).

In one embodiment the polymer composition (PC) comprises the polypropylene (PP) in an amount in the range of 55 to 95 parts per weight, the polar modified polypropylene (PMP) in an amount in the range of 2.5 to 10 parts per weight and the carbon fibers (CF) in an amount in the range of 2.5 to 35 parts per weight;
based on the total parts by weight of the polypropylene (PP), the polar modified polypropylene (PMP) and the carbon fibers (CF).

In one embodiment the polypropylene composition (PC) comprises the polypropylene (PP) in an amount in the range of 63 to 92 parts per weight, the polar modified polypropylene (PMP) in an amount in the range of 3.0 to 7.0 parts per weight and the carbon fibers (CF) in an amount in the range of 2.5 to 35 parts per weight;
based on the total parts by weight of the polypropylene (PP), the polar modified polypropylene (PMP) and the carbon fibers (CF).

In one embodiment the polymer composition (PC) comprises the polypropylene (PP) in an amount in the range of 65 to 87 parts per weight, the polar modified polypropylene (PMP) in an amount in the range of 3.0 to 6.0 parts per weight and the carbon fibers (CF) in an amount in the range of 5.0 to 30 parts per weight;
based on the total parts by weight of the polypropylene (PP), the polar modified polypropylene (PMP) and the carbon fibers (CF).

In one embodiment the polymer composition (PC) comprises the polypropylene (PP) in an amount in the range of 65 to 87 parts per weight, the polar modified polypropylene (PMP) in an amount in the range of 3.0 to 6.0 parts per weight and the carbon fibers (CF) in an amount in the range of 10 to 29 parts per weight;
based on the total parts by weight of the polypropylene (PP), the polar modified polypropylene (PMP) and the carbon fibers (CF).

In one embodiment the polymer composition (PC) comprises the polypropylene (PP) in an amount in the range of 55 to 95 wt.-%, the polar modified polypropylene (PMP) in an amount in the range of 2.5 to 10 wt.-% and the carbon fibers (CF) in an amount in the range of 2.5 to 35 wt.-%;
based on the total weight of the polymer composition (PC).

In one embodiment the polymer composition (PC) comprises the polypropylene (PP) in an amount in the range of 63 to 92 wt.-%, the polar modified polypropylene (PMP) in an amount in the range of 3.0 to 7.0 wt.-% and the carbon fibers (CF) in an amount in the range of 5.0 to 30 wt.-%;
based on the total weight of the polymer composition (PC).

In one embodiment the polymer composition (PC) comprises the polypropylene (PP) in an amount in the range of 65 to 87 wt.-%, the polar modified polypropylene (PMP) in an amount in the range of 3.0 to 6.0 wt.-% and the carbon fibers (CF) in an amount in the range of 10 to 29 wt.-%;
based on the total weight of the polymer composition (PC).

The instant polymer composition (PC) has a rather high melt flow rate to reduce the pressure during the injection molding process. Accordingly, the polymer composition (PC) has a melt flow rate $MFR_2$ (230° C., 2.16 kg) measured according to ISO 1133 of 20 to 30 g/10 min.

The polymer composition (PC) has a tensile modulus measured according to ISO 527-2 in the range of 8500 to 11500 MPa.

The polymer composition (PC) may have a tensile strength measured according to ISO 527-2 of at least 60 MPa, preferably of at least 80 MPa, like in the range of 60 to 130 MPa, preferably in the range of 80 to 115 MPa.

The polymer composition (PC) has a Charpy Impact Strength measured according to ISO 179-1 eU:2000 at 23° C. in the range of 30 to 50 $kJ/m^2$.

The polymer composition (PC) has a tensile elongation at break measured according to ISO 527-2 of in the range of 2.0 to 5.0%.

The polymer composition (PC) may have a flexural modulus measured according to ISO 178 of at least 5000 MPa, preferably at least 6500 MPa, like in the range of 5000 to 11000 MPa, preferably in the range of 6500 to 9500 MPa.

The polymer composition (PC) according to the present invention has a melt flow rate $MFR_2$ (230° C., 2.16 kg) measured according to ISO 1133 in the range of 20 to 30 g/10 min, a tensile modulus measured according to ISO 527-2 in the range of 8500 to 11500 MPa, a Charpy Impact Strength measured according to ISO 179-1 eU:2000 at 23° C. in the range of 30 to 50 $kJ/m^2$ and a tensile elongation at break measured according to ISO 527-2 in the range of 2.0 to 5.0%.

It is appreciated that the polymer composition has a heat deformation temperature (HDT) measured according to according to ISO 75-2 of at least 90° C., preferably at least 120° C., more preferably at least 150° C., like in the range of 90 to 190° C., preferably in the range of 120 to 170° C.

Preferably the polypropylene (PP) is the only polypropylene present in the polymer composition (PC). In one embodiment the polypropylene (PP) is the only polypropylene present in the polymer composition (PC).

Preferably the polar modified polypropylene (PMP) is the only polar modified polypropylene present in the polymer composition (PC). In one embodiment the polar modified polypropylene (PMP) is the only polar modified polypropylene present in the polymer composition (PC).

In a preferred embodiment the polymer composition (PC) does not comprise other polymers besides polypropylene (PP) and the polar modified polypropylene (PMP) in an amount exceeding 10 wt.-%, preferably in an amount exceeding 5 wt.-%, more preferably in an amount exceeding 2.5 wt.-%, even more preferably in an amount exceeding 0.8 wt.-%, based on the weight of the polymer composition (PC). If an additional polymer is present, such a polymer is typically a polymeric carrier material (PCM) for additives.

Preferably the polypropylene (PP) and the polar modified polypropylene (PMP) are the only polymers present in the polymer composition (PC). In one embodiment the polypropylene (PP) and the polar modified polypropylene (PMP) are the only polymers present in the polymer composition (PC).

Preferably the carbon fibers (CF) are the only fibers present in the polymer composition (PC). In one embodiment the polymer composition (PC) does not comprise fibers selected from the group consisting of glass fibers, metal fibers, mineral fibers, ceramic fibers and mixtures thereof. In one embodiment the polymer composition (PC) does not comprise fibers obtained from an inorganic material.

Thus, in a preferred embodiment the polymer composition (PC) consists of the polypropylene (PP), the polar modified polypropylene (PMP) and the carbon fibers (CF). However, it is appreciated that this does not exclude situations wherein additives (AD) are present as will be explained in detail below.

The polymer composition (PC) contains preferably an alpha-nucleating agent as part of the additives (AD). Even more preferred the present invention is free of beta-nucleating agents. The nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis(4,6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer, and (v) mixtures thereof.

Such additives are generally commercially available and are described, for example, in "Plastic Additives Handbook", 5th edition, 2001 of Hans Zweifel.

Most preferably the alpha-nucleating agent is part of the polypropylene (PP) and thus of the polymer composition (PC). Accordingly the alpha-nucleating agent content of the polypropylene (PP) is preferably up to 5.0 wt.-%, based on the weight of the polypropylene (PP). In a preferred embodiment, the polypropylene (PP) contain(s) not more than 3000 ppm, more preferably of 1 to 2000 ppm of an alpha-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl) methylene]-nonitol, vinylcycloalkane polymer, vinylalkane polymer, and mixtures thereof.

In a preferred embodiment the polypropylene (PP) and thus the polymer composition (PC) contains a vinylcycloalkane, like vinylcyclohexane (VCH), polymer and/or vinylalkane polymer, as the alpha-nucleating agent. Preferably, in this embodiment the polypropylene (PP) contains a vinylcycloalkane, like vinylcyclohexane (VCH), polymer and/or vinylalkane polymer, preferably vinylcyclohexane (VCH). Preferably the vinylcycloalkane is vinylcyclohexane (VCH) polymer which is introduced into the polypropylene (PP) and thus into the polymer composition (PC) by the BNT technology. More preferably in this preferred embodiment, the amount of vinylcycloalkane, like vinylcyclohexane (VCH), polymer and/or vinylalkane polymer, more preferably of vinylcyclohexane (VCH) polymer, in the polypropylene (PP) is not more than 500 ppm, more preferably of 1 to 200 ppm, most preferably 5 to 100 ppm, and the amount of vinylcycloalkane, like vinylcyclohexane (VCH), polymer and/or vinylalkane polymer, more preferably of vinylcyclohexane (VCH) polymer, in the polypropylene (PP) is not more than 500 ppm, more preferably of 1 to 200 ppm, most preferably 5 to 100 ppm. Accordingly it is thus preferred that the polymer composition (PC) contains not more than 500 ppm, more preferably of 0.1 to 200 ppm, most preferably 0.2 to 100 ppm, of vinylcycloalkane, like vinylcyclohexane (VCH) polymer.

With regard to the BNT-technology reference is made to the international applications WO 99/24478, WO 99/24479 and particularly WO 00/68315. According to this technology a catalyst system, preferably a Ziegler-Natta procatalyst, can be modified by polymerising a vinyl compound in the presence of the catalyst system, comprising in particular the special Ziegler-Natta procatalyst, an external donor and a cocatalyst, which vinyl compound has the formula:

$CH_2=CH-CHR^3R^4$ wherein $R^3$ and $R^4$ together form a 5- or 6-membered saturated, unsaturated or aromatic ring or independently represent an alkyl group comprising 1 to 4 carbon atoms, and the modified catalyst is used for the preparation of the polypropylene (PP) according to this invention. The polymerized vinyl compound acts as an alpha-nucleating agent. The weight ratio of vinyl compound to solid catalyst component in the modification step of the catalyst is preferably of up to 5 (5:1), preferably up to 3 (3:1) most preferably from 0.5 (1:2) to 2 (2:1). The most preferred vinyl compound is vinylcyclohexane (VCH).

The nucleating agent can be introduced as a master batch. In this case a master batch contains a nucleating agent, which is preferably a polymeric nucleating agent, more preferably alpha-nucleating agent, most preferably a vinylcycloalkane, like vinylcyclohexane (VCH), polymer and/or vinylalkane polymer, preferably vinylcyclohexane (VCH) polymer, as defined above or below, in an amount of not more than 500 ppm, more preferably of 1 to 200 ppm, and still more preferably of 5 to 100 ppm, based on the weight of the master batch. In this embodiment, more preferably, said master batch is present in an amount of not more than 10.0 wt.-%, more preferably not more than 5.0 wt.-% and most preferably not more than 3.5 wt.-%, with the preferred amount of master batch being from 1.5 to 3.5 wt.-%, based on the total weight of the polypropylene (PP). Most preferably the master batch comprises, preferably consists of a polymer which has been nucleated according to BNT-technology.

The Polypropylene (PP)

It is appreciated that the polymer composition (PC) has well-balanced mechanical and optical properties in combination with a low viscosity. In order to achieve these properties it is an essential requirement to include the polypropylene composition (PP).

The polypropylene composition (PP) may comprise at least one propylene homopolymer, at least one propylene copolymer, at least one ethylene copolymer and/or mixtures thereof.

If the polypropylene composition (PP) comprises propylene homopolymer this propylene homopolymer may be multimodal with respect to its molecular weight distribution curve, which is the graph of the molecular weight fraction as a function of its molecular weight.

In one embodiment the polypropylene composition (PP) comprises a propylene homopolymer which is multimodal with respect to its molecular weight distribution curve. In this case the polypropylene composition may comprise at least two, preferably three, propylene homopolymers selected from propylene homopolymer (HPP-1), propylene homopolymer (HPP-2) and propylene homopolymer (HPP-2), wherein the propylene homopolymer (PPH-1), the propylene homopolymer (PPH-2) and the propylene homopolymer (PPH-3) differ from each other in their melt flow rate $MFR_2$ (230° C., 2.16 kg load).

The expression "propylene homopolymer" relates to a polypropylene that consists substantially, i.e. of more than 99.7 wt.-%, still more preferably of at least 99.8 wt.-%, of propylene units, based on the weight of the propylene homopolymer. In a preferred embodiment only propylene units are detectable in the propylene homopolymer.

The expression "propylene copolymer" relates to polypropylene copolymerized with monomers not derived from propylene. The expression "propylene copolymer" encompasses propylene random copolymers, heterophasic propylene copolymers and mixtures thereof.

The expression "ethylene copolymer" relates to ethylene copolymerized with monomers not derived from ethylene. The expression "ethylene copolymer" encompasses ethylene random copolymers, heterophasic ethylene copolymers and mixtures thereof.

The expression "heterophasic propylene copolymer" is directed at propylene copolymer comprising a propylene homo or random copolymer matrix component and an elastomeric copolymer component of propylene with one or more of ethylene and $C_4$-$C_{12}$ alpha-olefin copolymers or an elastomeric copolymer component of ethylene with one or more of $C_4$-$C_{12}$ alpha-olefin copolymers, wherein the elastomeric (amorphous) copolymer component is dispersed in said propylene homo or random copolymer matrix component. The expression "heterophasic" indicates that at least one elastomeric copolymer is (finely) dispersed in a matrix. In other words, the at least one elastomeric copolymer forms inclusions in the matrix. Thus the matrix contains (finely) dispersed inclusions being not part of the matrix and said inclusions contain the at least one elastomeric copolymer. The term "inclusion" shall indicate that the matrix and the inclusion form different phases within the heterophasic propylene copolymer, said inclusions are for instance visible by high resolution microscopy, like electron microscopy or scanning force microscopy.

The expression "random" indicates that the co-monomers of the random propylene copolymers (RPP) and the random ethylene copolymers (RPE) are randomly distributed within the units derived from propylene in case of a random propylene copolymer (RPP) and the units derived from ethylene in case of a random ethylene copolymer (RPE). The term random is understood according to IUPAC (Glossary of basic terms in polymer science; IUPAC recommendations 1996).

Where the expression "comprising" is used in the present description and claims, it does not exclude other elements. For the purposes of the present invention, the expression "consisting of" is considered to be a preferred embodiment of the expression "comprising of". If hereinafter a group is defined to comprise at least a certain number of embodiments, this is also to be understood to disclose a group, which preferably consists only of these embodiments.

The polypropylene composition (PP) may comprise, preferably may consist of:
(a) a first propylene homopolymer (PPH-1);
and/or
(b) a second propylene homopolymer (PPH-2);
and/or
(c) a third propylene homopolymer (PPH-3);
 wherein the first propylene homopolymer (PPH-1), the second propylene homopolymer (PPH-2) and the third propylene homopolymer (PPH-3) differ from each other in their melt flow rate $MFR_2$ (230° C., 2.16 kg load).

In this embodiment it is appreciated that the polymer composition (PC) does not comprise any other polymer in an amount exceeding 5.0 wt.-%, more preferably exceeding 3.0 wt.-%, even more preferably exceeding 1.0 wt.-%, yet even more preferably exceeding 0.8 wt.-%, based on the total weight of the polymer composition (PC), besides the first propylene homopolymer (PPH-1), the second propylene homopolymer (PPH-2), the third propylene homopolymer (PPH-3) and the polar modified polypropylene (PMP). In particular it is appreciated that the polymer composition (PC) does not comprise any other polymer besides the first propylene homopolymer (PPH-1), the second propylene homopolymer (PPH-2), the third propylene homopolymer (PPH-3) and the polar modified polypropylene (PMP).

The polypropylene composition (PP) may comprise, preferably may consist of:

(a) a first propylene homopolymer (PPH-1);
or
(b) a second propylene homopolymer (PPH-2);
or
(c) a third propylene homopolymer (PPH-3).

In this embodiment it is appreciated that the polymer composition (PC) does not comprise any other polymer in an amount exceeding 5.0 wt.-%, more preferably exceeding 3.0 wt.-%, even more preferably exceeding 1.0 wt.-%, yet even more preferably exceeding 0.8 wt.-%, based on the total weight of the polymer composition (PC), besides the first propylene homopolymer (PPH-1), the second propylene homopolymer (PPH-2), the third propylene homopolymer (PPH-3) and the polar modified polypropylene (PMP). In particular it is appreciated that the polymer composition (PC) does not comprise any other polymer besides the first propylene homopolymer (PPH-1), the second propylene homopolymer (PPH-2), the third propylene homopolymer (PPH-3) and the polar modified polypropylene (PMP).

In one embodiment the polypropylene (PP) comprises, preferably consists of a first propylene homopolymer (PPH-1) and a second propylene homopolymer (PPH-2), wherein the first propylene homopolymer (PPH-1) and the second propylene homopolymer (PPH-2) differ from each other in their melt flow rate $MFR_2$ (230° C., 2.16 kg load).

In this embodiment it is appreciated that the polymer composition (PC) does not comprise any other polymer in an amount exceeding 5.0 wt.-%, more preferably exceeding 3.0 wt.-%, even more preferably exceeding 1.0 wt.-%, yet even more preferably exceeding 0.8 wt.-%, based on the total weight of the polymer composition (PC), besides the first propylene homopolymer (PPH-1), the second propylene homopolymer (PPH-2) and the polar modified polypropylene (PMP). In particular it is appreciated that the polymer composition (PC) does not comprise any other polymer besides the first propylene homopolymer (PPH-1), the second propylene homopolymer (PPH-2), and the polar modified polypropylene (PMP).

In one embodiment the polypropylene (PP) comprises, preferably consists of a first propylene homopolymer (PPH-1) and a third propylene homopolymer (PPH-3), wherein the first propylene homopolymer (PPH-1) and the third propylene homopolymer (PPH-3) differ from each other in their melt flow rate $MFR_2$ (230° C., 2.16 kg load).

In this embodiment it is appreciated that the polymer composition (PC) does not comprise any other polymer in an amount exceeding 5.0 wt.-%, more preferably exceeding 3.0 wt.-%, even more preferably exceeding 1.0 wt.-%, yet even more preferably exceeding 0.8 wt.-%, based on the total weight of the polymer composition (PC), besides the first propylene homopolymer (PPH-1), the third propylene homopolymer (PPH-3) and the polar modified polypropylene (PMP). In particular it is appreciated that the polymer composition (PC) does not comprise any other polymer besides the first propylene homopolymer (PPH-1), the third propylene homopolymer (PPH-3), and the polar modified polypropylene (PMP).

In one embodiment the polypropylene (PP) comprises, preferably consists of a second propylene homopolymer (PPH-2) and a third propylene homopolymer (PPH-3), wherein the second propylene homopolymer (PPH-2) and the third propylene homopolymer (PPH-3) differ from each other in their melt flow rate $MFR_2$ (230° C., 2.16 kg load).

In this embodiment it is appreciated that the polymer composition (PC) does not comprise any other polymer in an amount exceeding 5.0 wt.-%, more preferably exceeding 3.0 wt.-%, even more preferably exceeding 1.0 wt.-%, yet even more preferably exceeding 0.8 wt.-%, based on the total weight of the polymer composition (PC), besides the second propylene homopolymer (PPH-2), the third propylene homopolymer (PPH-3) and the polar modified polypropylene (PMP). In particular it is appreciated that the polymer composition (PC) does not comprise any other polymer besides the second propylene homopolymer (PPH-2), the third propylene homopolymer (PPH-3), and the polar modified polypropylene (PMP).

In one embodiment the polypropylene (PP) comprises, preferably consists of a first propylene homopolymer (PPH-1) a second propylene homopolymer (PPH-2) and a third propylene homopolymer (PPH-3), wherein the first propylene homopolymer (PPH-1), the second propylene homopolymer (PPH-2) and the third propylene homopolymer (PPH-3) differ from each other in their melt flow rate MFR2 (230° C., 2.16 kg load).

In this embodiment it is appreciated that the polymer composition (PC) does not comprise any other polymer in an amount exceeding 5.0 wt.-%, more preferably exceeding 3.0 wt.-%, even more preferably exceeding 1.0 wt.-%, yet even more preferably exceeding 0.8 wt.-%, based on the total weight of the polymer composition (PC), besides the first propylene homopolymer (PPH-1), the second propylene homopolymer (PPH-2), the third propylene homopolymer (PPH-3) and the polar modified polypropylene (PMP). In particular it is appreciated that the polymer composition (PC) does not comprise any other polymer besides the first propylene homopolymer (PPH-1), the second propylene homopolymer (PPH-2), the third propylene homopolymer (PPH-3) and the polar modified polypropylene (PMP).

It is appreciated that the propylene homopolymer (HPP-1) and the propylene homopolymer (HPP-2) comprised in the polymer composition (PC) fulfill together inequation (Ia), preferably inequation (Ib), more preferably inequation (Ic), even more preferably inequation (Id)

$$[MFR(HPP-2)]/[MFR(HPP-1)] \geq 1.1 \quad (Ia)$$

$$190 \geq [MFR(HPP-2)]/[MFR(HPP-1)] \geq 1.1 \quad (Ib)$$

$$50 \geq [MFR(HPP-2)]/[MFR(HPP-1)] \geq 1.5 \quad (Ic)$$

$$10 \geq [MFR(HPP-2)]/[MFR(HPP-1)] \geq 3.0 \quad (Id)$$

wherein

[MFR (HPP-1)] is the melt flow rate $MFR_2$ (230° C., 2.16 kg) measured according to ISO 1133 of the propylene homopolymer (HPP-1) and [MFR (HPP-2)] is the melt flow rate MFR$_2$ (230° C., 2.16 kg) measured according to ISO 1133 of the propylene homopolymer (HPP-2).

It is appreciated that the propylene homopolymer (HPP-2) and the propylene homopolymer (HPP-3) comprised in the polymer composition (PC) fulfill together inequation (IIa), preferably inequation (IIb), more preferably inequation (IIc), even more preferably inequation (IId)

$$[MFR(HPP-3)]/[MFR(HPP-2)] \geq 1.1 \quad (IIa)$$

$$25 \geq [MFR(HPP-3)]/[MFR(HPP-2)] \geq 1.0 \quad (IIb)$$

$$20 \geq [MFR(HPP-3)]/[MFR(HPP-2)] \geq 2.0 \quad (IIc)$$

$$15 \geq [MFR(HPP-3)]/[MFR(HPP-2)] \geq 5.0 \quad (IId)$$

wherein

[MFR (HPP-2)] is the melt flow rate MFR$_2$ (230° C., 2.16 kg) measured according to ISO 1133 of the propylene homopolymer (HPP-2) and [MFR (HPP-3)] is the melt flow rate MFR$_2$ (230° C., 2.16 kg) measured according to ISO 1133 of the propylene homopolymer (HPP-3).

It is appreciated that the propylene homopolymer (HPP-1) and the propylene homopolymer (HPP-3) comprised in the polymer composition (PC) fulfill together inequation (IIIa), preferably inequation (IIIb), more preferably inequation (IIIc), even more preferably inequation (IIId)

$$[MFR(HPP-3)]/[MFR(HPP-1)] \geq 4.0 \quad (IIIa)$$

$$800 \geq [MFR(HPP-3)]/[MFR(HPP-1)] \geq 4.0 \quad (IIIb)$$

$$150 \geq [MFR(HPP-3)]/[MFR(HPP-1)] \geq 10 \quad (IIIc)$$

$$60 \geq [MFR(HPP-3)]/[MFR(HPP-1)] \geq 20 \quad (IIId)$$

wherein

[MFR (HPP-1)] is the melt flow rate MFR$_2$ (230° C., 2.16 kg) measured according to ISO 1133 of the propylene homopolymer (HPP-1) and [MFR (HPP-3)] is the melt flow rate MFR$_2$ (230° C., 2.16 kg) measured according to ISO 1133 of the propylene homopolymer (HPP-3).

In one embodiment the polypropylene (PP) comprises, preferably consists of:
(a) a first propylene homopolymer (PPH-1) and/or a second propylene homopolymer (PPH-2) and/or a third propylene homopolymer (PPH-3);
and
(b) a random ethylene copolymer (RPE);
wherein the first propylene homopolymer (PPH-1), the second propylene homopolymer (PPH-2) and the third propylene homopolymer (PPH-3) differ from each other in their melt flow rate MFR2 (230° C., 2.16 kg load).

In this embodiment it is appreciated that the polymer composition (PC) does not comprise any other polymer in an amount exceeding 5.0 wt.-%, more preferably exceeding 3.0 wt.-%, even more preferably exceeding 1.0 wt.-%, yet even more preferably exceeding 0.8 wt.-%, based on the total weight of the polymer composition (PC), besides
(a) the first propylene homopolymer (PPH-1) and/or the second propylene homopolymer (PPH-2) and/or the third propylene homopolymer (PPH-3);
(b) the random ethylene copolymer (RPE); and
(c) the polar modified polypropylene (PMP).

In particular it is appreciated that the polymer composition (PC) does not comprise any other polymer besides:
(a) the first propylene homopolymer (PPH-1) and/or the second propylene homopolymer (PPH-2) and/or the third propylene homopolymer (PPH-3);
(b) the random ethylene copolymer (RPE); and
(c) the polar modified polypropylene (PMP).

In one embodiment the polypropylene (PP) comprises, preferably consists of a first propylene homopolymer (PPH-1) a second propylene homopolymer (PPH-2), a third propylene homopolymer (PPH-3), and a random ethylene copolymer (RPE), wherein the first propylene homopolymer (PPH-1), the second propylene homopolymer (PPH-2) and the third propylene homopolymer (PPH-3) differ from each other in their melt flow rate MFR2 (230° C., 2.16 kg load).

In this embodiment it is appreciated that the polymer composition (PC) does not comprise any other polymer in an amount exceeding 5.0 wt.-%, more preferably exceeding 3.0 wt.-%, even more preferably exceeding 1.0 wt.-%, yet even more preferably exceeding 0.8 wt.-%, based on the total weight of the polymer composition (PC), besides the first propylene homopolymer (PPH-1), the second propylene homopolymer (PPH-2), the third propylene homopolymer (PPH-3), the random ethylene copolymer (RPE) and the polar modified polypropylene (PMP).

In particular it is appreciated that the polymer composition (PC) does not comprise any other polymer besides the first propylene homopolymer (PPH-1), the second propylene homopolymer (PPH-2), the third propylene homopolymer (PPH-3), the random ethylene copolymer (RPE) and the polar modified polypropylene (PMP).

In one embodiment the polypropylene (PP) comprises, preferably consists of:
(a) a first propylene homopolymer (PPH-1) and/or a second propylene homopolymer (PPH-2) and/or a third propylene homopolymer (PPH-3);
and
(b) a heterophasic propylene copolymer (HECO);
wherein the first propylene homopolymer (PPH-1), the second propylene homopolymer (PPH-2) and the third propylene homopolymer (PPH-3) differ from each other in their melt flow rate MFR2 (230° C., 2.16 kg load).

In this embodiment it is appreciated that the polymer composition (PC) does not comprise any other polymer in an amount exceeding 5.0 wt.-%, more preferably exceeding 3.0 wt.-%, even more preferably exceeding 1.0 wt.-%, yet even more preferably exceeding 0.8 wt.-%, based on the total weight of the polymer composition (PC), besides
(a) the first propylene homopolymer (PPH-1) and/or the second propylene homopolymer (PPH-2) and/or the third propylene homopolymer (PPH-3);
(b) the heterophasic propylene copolymer (HECO); and
(c) the polar modified polypropylene (PMP).

In particular it is appreciated that the polymer composition (PC) does not comprise any other polymer besides:
(a) the first propylene homopolymer (PPH-1) and/or the second propylene homopolymer (PPH-2) and/or the third propylene homopolymer (PPH-3);
(b) the heterophasic propylene copolymer (HECO); and
(c) the polar modified polypropylene (PMP).

In one embodiment the polypropylene (PP) comprises, preferably consists of a first propylene homopolymer (PPH-1) a second propylene homopolymer (PPH-2), a third propylene homopolymer (PPH-3), and a heterophasic propylene copolymer (HECO), wherein the first propylene homopolymer (PPH-1), the second propylene homopolymer (PPH-2) and the third propylene homopolymer (PPH-3) differ from each other in their melt flow rate MFR2 (230° C., 2.16 kg load).

In this embodiment it is appreciated that the polymer composition (PC) does not comprise any other polymer in an amount exceeding 5.0 wt.-%, more preferably exceeding 3.0 wt.-%, even more preferably exceeding 1.0 wt.-%, yet even more preferably exceeding 0.8 wt.-%, based on the total weight of the polymer composition (PC), besides the first propylene homopolymer (PPH-1), the second propylene homopolymer (PPH-2), the third propylene homopolymer (PPH-3), the heterophasic propylene copolymer (HECO) and the polar modified polypropylene (PMP).

In particular it is appreciated that the polymer composition (PC) does not comprise any other polymer besides the first propylene homopolymer (PPH-1), the second propylene homopolymer (PPH-2), the third propylene homopolymer (PPH-3), the heterophasic propylene copolymer (HECO) and the polar modified polypropylene (PMP).

The polymer composition (C) can be obtained by melt blending. This process may include steps of adding
(a) polypropylene (PP);
(b) polar modified polypropylene (PMP); and
(c) carbon fibers (CF);
to an extruder and extruding the same obtaining said polymer composition (PC).

The polymer composition (PC) may be compounded and pelletized using any of the variety of compounding and blending machines and methods well known and commonly used in the resin compounding art. However, it is preferred using a compounding and blending method that does not affect the carbon fiber dimensions or the dimensions of the fibers other than carbon fibers.

For blending the individual components of the instant composition a conventional compounding or blending apparatus, e.g. a Banbury mixer, a 2-roll rubber mill, Buss-co-kneader or a twin screw extruder may be used. The polymer materials recovered from the extruder/mixer are usually in the form of pellets. These pellets are then preferably further processed, e.g. by injection molding to generate articles and products of the inventive composition.

The Propylene Homopolymer (PPH-1)

The propylene homopolymer (PPH-1) consists substantially, i.e. of more than 99.7 wt.-%, still more preferably of at least 99.8 wt.-%, of propylene units, based on the weight of the propylene homopolymer (PPH-1). In a preferred embodiment only propylene units are detectable in the propylene homopolymer (PPH-1).

The propylene homopolymer (PPH-1) may have a melt flow rate $MFR_2$ (230° C.) measured according to ISO 1133 of at least 1.0 g/10 min, preferably at least 5.0 g/10 min, more preferably at least 10 g/10 min, even more preferably at least 15 g/10 min, like in the range from 1.0 to 45 g/10 min, preferably in the range of 5.0 to 40 g/10 min, more preferably in the range of 10 to 30 g/10 min, and most preferably in the range of 15 to 25 g/10 min.

It is appreciated that the propylene homopolymer (PPH-1) features a low amount of xylene cold soluble (XCS) fraction. The propylene homopolymer (PPH-1) may have an amount of xylene cold solubles (XCS) fraction of not more than 4.0 wt.-%, preferably not more than 3.0 wt.-%, more preferably not more than 2.5 wt.-%, like in the range of 0.1 to 4.0 wt.-%, preferably in the range of 0.1 to 3.0 wt.-%, more preferably in the range from 0.1 to 2.5 wt.-%, based on the weight of the propylene homopolymer (PPH-1).

The propylene homopolymer (PPH-1) may have a heat deformation temperature (HDT) measured according to according to ISO 75-2 of at least 90° C., preferably at least 100° C., more preferably at least 115° C., like in the range of 90 to 160° C., preferably in the range of 100 to 150° C., more preferably 115 to 130° C.

The propylene homopolymer (PPH-1) may have a Charpy Impact Strength measured according to ISO 179-1 eU:2000 at 23° C. of at least 1.0 kJ/m², preferably, at least 2.0 kJ/m², like in the range of 1.0 to 10 kJ/m², preferably in the range of 2.0 to 5.0 kJ/m².

The propylene homopolymer (PPH-1) may have a flexural modulus measured according to ISO 178 of at least 500 MPa, preferably at least 1500 MPa, like in the range of 500 to 3500 MPa, preferably in the range of 1500 to 2500 MPa.

The propylene homopolymer (PPH-1) may comprise a nucleating agent which is preferably a polymeric nucleating agent, more preferably an alpha-nucleating agent, e.g. a polymeric alpha-nucleating agent. The alpha-nucleating agent content of the propylene homopolymer (PPH-1), is preferably up to 5.0 wt.-%. In a preferred embodiment, the propylene homopolymer (PPH-1) contains not more than 3000 ppm, more preferably of 1 to 2000 ppm of alpha-nucleating agent.

More details on the alpha-nucleating agents are provided in the section "The Polymer Composition (PC)". The propylene homopolymer (PPH-1) is known in the art and commercially available. A suitable example is HF955MO of Borealis AG.

The Propylene Homopolymer (PPH-2)

The propylene homopolymer (PPH-2) consists substantially, i.e. of more than 99.7 wt.-%, still more preferably of at least 99.8 wt.-%, of propylene units, based on the weight of the propylene homopolymer (PPH-2). In a preferred embodiment only propylene units are detectable in the propylene homopolymer (PPH-2).

The propylene homopolymer (PPH-2) may have a melt flow rate $MFR_2$ (230° C.) measured according to ISO 1133 at least 50 g/10 min, preferably at least 60 g/10 min, more preferably at least 65 g/10 min, even more preferably at least 70 g/10 min, like in the range from 50 to 190 g/10 min, preferably in the range of 60 to 150 g/10 min, more preferably in the range of 65 to 100 g/10 min, even more preferably in the range of 70 to 80 g/10 min.

It is appreciated that the propylene homopolymer (PPH-2) features a low amount of xylene cold soluble (XCS) fraction. The propylene homopolymer (PPH-2) may have an amount of xylene cold solubles (XCS) fraction of not more than 4.0 wt.-%, preferably not more than 3.5 wt.-%, like in the range of 0.1 to 4.0 wt.-%, preferably in the range of 0.1 to 3.5 wt.-%, based on the weight of the propylene homopolymer (PPH-2).

The propylene homopolymer (PPH-2) may have a heat deformation temperature (HDT) measured according to according to ISO 75-2 of at least 50° C., preferably at least 60° C., more preferably at least 75° C., like in the range of 50 to 120° C., preferably in the range of 60 to 100° C., more preferably 75 to 90° C.

The propylene homopolymer (PPH-2) may have a Charpy Notched Impact Strength (NIS) measured according to ISO 179-1 eA at 23° C. of at least 0.5 kJ/m², preferably, at least 0.7 kJ/m², like in the range of 0.5 to 1.5 kJ/m², preferably in the range of 0.7 to 1.3 kJ/m².

The propylene homopolymer (PPH-2) may have a flexural modulus measured according to ISO 178 of at least 500 MPa, preferably at least 1000 MPa, like in the range of 500 to 2500 MPa, preferably in the range of 1000 to 2000 MPa.

In case the propylene homopolymer (PPH-2) comprises an alpha-nucleating agent it is appreciated that the propylene homopolymer (PPH-2) may comprise the alpha-nucleating agent in an amount of up to 5.0 wt.-%, based on the weight of the propylene homopolymer (PPH-2), preferably up to 3000 ppm, like in the range of 1 to 2000 ppm. However, in a preferred embodiment the propylene homopolymer (PPH- 2) does not comprise any nucleating agent, i.e. the propylene homopolymer (PPH-2) is not nucleated.

More details on the alpha-nucleating agents are provided in the section "The Polymer Composition (PC)".

The propylene homopolymer (PPH-2) is known in the art and commercially available. A suitable example is HJ120UB of Borealis AG.

The Propylene Homopolymer (PPH-3)

The propylene homopolymer (PPH-3) consists substantially, i.e. of more than 99.7 wt.-%, still more preferably of at least 99.8 wt.-%, of propylene units, based on the weight of the propylene homopolymer (PPH-3). In a preferred embodiment only propylene units are detectable in the propylene homopolymer (PPH-3).

The propylene homopolymer (PPH-3) may have a melt flow rate $MFR_2$ (230° C.) measured according to ISO 1133 at least 200 g/10 min, preferably at least 300 g/10 min, more preferably at least 400 g/10 min, even more preferably at least 420 g/10 min, like in the range from 200 to 800 g/10 min, preferably in the range of 300 to 600 g/10 min, more preferably in the range of 400 to 500 g/10 min, even more preferably in the range of 420 to 480 g/10 min.

The propylene homopolymer (PPH-3) may have a content of xylene cold soluble (XCS) fraction of not more than 10 wt.-%, preferably not more than 7.0 wt.-%, even more preferably not more than 4.5 wt.-%, like in the range of 0.1 to 10 wt.-%, preferably in the range of 0.5 to 7.0 wt.-%, more preferably in the range of 2.0 to 4.5 wt.-%, based on the weight of the weight of the propylene homopolymer (PPH-3).

The propylene homopolymer (PPH-3) may have a melting temperature $T_m$ of at least 150° C., preferably at least 158° C., like in the range of 150 to 180° C., preferably in the range of 158 to 170° C., more preferably in the range of 161 to 165° C.

The propylene homopolymer (PPH-3) may comprise a nucleating agent which is preferably a polymeric nucleating agent, more preferably an alpha-nucleating agent, e.g. a polymeric alpha-nucleating agent.

The alpha-nucleating agent content of the propylene homopolymer (PPH-3), is preferably up to 5.0 wt.-%. In a preferred embodiment, the propylene homopolymer (PPH-3) contains not more than 3000 ppm, more preferably of 1 to 2000 ppm of alpha-nucleating agent.

More details on the alpha-nucleating agents are provided in the section "The Polymer Composition (PC)".

The propylene homopolymer (PPH-3) is known in the art and commercially available. A suitable example is HL504FB of Borealis AG.

The Random Ethylene Copolymer (RPE)

The polypropylene composition (PP) may comprise a random ethylene copolymer (RPE). The random ethylene copolymer (RPE) is preferably an elastomeric copolymer comprising, preferably consisting of, units derivable from ethylene and units derivable from at least one $C_3$ to $C_{10}$ alpha-olefin, preferably at least one $C_3$ to $C_8$ alpha-olefin, more preferably at least one $C_4$ to $C_8$ alpha-olefin, like at least one $C_3$ to $C_8$ alpha-olefin, preferably at least one $C_4$ to $C_8$ alpha-olefin; more preferably units derivable from ethylene and units derivable from at least one alpha-olefin selected form the group consisting of 1-butene, 1-pentene, 1-hexene, 1-heptene and 1-octene, preferably selected from 1-butene and 1-octene, more preferably from 1-octene.

Accordingly the random ethylene copolymer (RPE) comprises at least units derivable from ethylene and units derivable from a further alpha-olefin as defined in the previous paragraph.

However it is in particular preferred that random ethylene copolymer (RPE) comprises units only derivable from ethylene and units derivable from a further alpha-olefin like 1-butene, 1-pentene, 1-hexene, 1-heptene and 1-octene. It is especially preferred that random ethylene copolymer (RPE) comprises only units derivable from ethylene and units selected from 1-butene, 1-hexene and 1-octene. In one embodiment the random ethylene copolymer (RPE) comprises units only derivable from ethylene and units derivable from 1-octene.

The random ethylene copolymer (RPE) may be comprised in the polypropylene (PP) in form of (finely) dispersed elastomeric inclusions in a crystalline or semi-crystalline matrix phase, such as a matrix phase comprising the propylene homopolymer (PPH-1), the propylene homopolymer (PPH-2) and the propylene homopolymer (PPH-3). The random ethylene copolymer (RPE) may form on its part inclusions (finely dispersed) within other elastomeric compounds, such as a further random ethylene copolymer or the elastomeric phase of a heterophasic propylene copolymer. However, it is preferred that the random ethylene copolymer (RPE) is the only elastomeric compound in the polymer composition (PC).

The random ethylene copolymer (RPE) may have a melt flow rate $MFR_2$ (190° C., 2.16 kg) measured according to ISO 1133 of not more than 100 g/10 min, preferably of not more than 50 g/10 min, more preferably of not more than 40 g/10 min, even more preferably of not more than 35 g/10 min, like in the range of 0.2 to 100 g/10 min, preferably in the range of 0.5 to 50 g/10 min, more preferably in the range of 0.5 to 40 g/10 min, even more preferably in the range of 0.5 to 35 g/10 min, yet even more preferably in the range of 0.5 to 30 g/10 min.

In one embodiment the random ethylene copolymer (RPE) has a melt flow rate $MFR_2$ (190° C., 2.16 kg) measured according to ISO 1133 in the range of 5.0 to 80 g/10 min, preferably in the range of 10 to 50 g/10 min, more preferably in the range of 20 to 40 g/10 min, even more preferably in the range of 25 to 35 g/10 min.

In one embodiment the random ethylene copolymer (RPE) has a melt flow rate $MFR_2$ (190° C., 2.16 kg) measured according to ISO 1133 in the range of 0.1 to 10 g/10 min, preferably in the range of 0.3 to 5.0 g/10 min, more preferably in the range of 0.5 to 2.0 g/10 min, even more preferably in the range of 0.7 to 1.3 g/10 min.

The random ethylene copolymer (RPE) may have a density measured according to ISO 1183-187 of not more than 910 kg/cm$^3$, preferably of not more than 885 kg/cm$^3$, like in the range of 854 to 910 kg/cm$^3$, preferably in the range of 854 to 885 kg/cm$^3$.

The random ethylene copolymer (RPE) may have an ethylene content of at least 80 mol %, preferably is at least 92 mol %, like in the range of 80 to 98 mol %, preferably in the range of 82 to 92 mol %.

In other words, the random ethylene copolymer (RPE) may comprise the at least one $C_3$ to $C_{10}$ alpha-olefin, preferably the at least one $C_3$ to $C_8$ alpha-olefin, more preferably the at least one $C_4$ to $C_8$ alpha-olefin, lie the 1-butene, 1-hexene and 1-octene, preferably the 1-octene, in an amount of up to 20 mol %, preferably up to 18 mol %, like in the range of 2.0 to 20 mol %, preferably in the range of 8 to 18 mol %.

The random ethylene copolymer (RPE) is known in the art and commercially available. Suitable examples are Queo8230 and Queo8201 of Borealis AG.

The Heterophasic Propylene Copolymer (HECO)

The polypropylene composition (PP) may comprise a heterophasic propylene copolymer (HECO).

As indicated above, a heterophasic propylene copolymer comprises as polymer components a polypropylene matrix and an elastomeric copolymer.

The heterophasic propylene copolymer (HECO) preferably comprises
(a) a polypropylene matrix (M) and
(b) an elastomeric copolymer (E) comprising units derived from
propylene and
ethylene and/or $C_4$ to $C_{20}$ alpha-olefins, more preferably from ethylene and/or $C_4$ to $C_{10}$ alpha-olefins and most preferably from ethylene, $C_4$, $C_6$ and/or $C_8$ alpha-olefins, e.g. ethylene and, optionally, units derived from a conjugated diene.

The polypropylene matrix (M) is preferably a random propylene copolymer or a propylene homopolymer, the latter being especially preferred.

In case the polypropylene matrix (M) is a propylene homopolymer it is appreciated that the comonomer content of the polypropylene matrix (M) is be not more than 1.0 wt.-%, preferably not more than 0.8 wt.-%, more preferably not more than 0.5 wt.-%, like not more than 0.2 wt.-%, based on the weight of the polypropylene matrix (M).

In case the polypropylene matrix (M) is a random propylene copolymer it is appreciated that the random propylene copolymer comprises monomers co-polymerizable with propylene, for example comonomers such as ethylene and/or $C_4$ to $C_{20}$ alpha-olefins, in particular ethylene and/or $C_4$ to $C_{10}$-alpha-olefins, e.g. ethylene, $C_4$, $C_6$ and/or $C_8$ alpha-olefins. Preferably the random propylene copolymer comprises, especially consists of, monomers co-polymerizable with propylene from the group consisting of ethylene, 1-butene and 1-hexene. More specifically the random propylene copolymer comprises—apart from propylene—units derivable from ethylene and/or 1-butene. In a preferred embodiment the random propylene copolymer comprises units derivable from ethylene and propylene only. Additionally it is appreciated that the random propylene copolymer has preferably a comonomer content in the range of more than 0.3 to 1.0 wt.-%, more preferably in the range of more than 0.3 to 0.8 wt.-%, yet more preferably in the range of 0.3 to 0.7 wt.-%, based on the weight of the random propylene copolymer.

The polypropylene matrix (M) may be isotactic. Accordingly it is appreciated that the polypropylene matrix (M) has a rather high pentad concentration, i.e. higher than 80%, preferably higher than 85%, more preferably higher than 90%, even more preferably higher than 92%, yet even more preferably higher than 93%, like higher than 95%.

Further, it is appreciated that the polypropylene matrix (M) of the heterophasic propylene copolymer (HECO) has a rather high melt flow rate. As stated above the melt flow rate $MFR_2$ (230° C., 2.16 kg) measured according to ISO1133 of the polypropylene matrix (M) equates with the melt flow rate $MFR_2$ of the xylene cold insoluble (XCI) fraction of the heterophasic propylene copolymer (HECO). Thus it is preferred that the xylene cold insoluble (XCI) fraction of the heterophasic propylene copolymer (HECO) has a melt flow rate $MFR_2$ (230° C., 2.16 kg) measured according to ISO1133 in the range of 50 to 200 g/10 min, more preferably in the range of 80 to 150 g/10 min, even more preferably in the range of 100 to 130 g/10 min.

The heterophasic polypropylene (HECO) may have an $MFR_2$ (230° C., 2.16 kg) measured according to ISO 1133 of not more 60 g/10 min, preferably not more than 40 g/10 min, more preferably not more than 30 g/10 min, like in the range of 5.0 to 60 g/10 min, preferably in the range of 10 to 40 g/10 min, more preferably in the range of 20 to 30 g/10 min.

The heterophasic polypropylene (HECO) may have a total comonomer content of not more than 35 mol %, preferably not more than 30 mol %, more preferably not more than 22 mol %, like in the range of 5.0 to 35 mol %, preferably in the range of 10 to 30 mol %, more preferably in the range of 15 to 22 mol %.

The heterophasic polypropylene (HECO) may have an amount of xylene cold soluble (XCS) fraction of not more than 60 wt.-%, preferably not more than 45 wt.-%, more preferably not more than 35 wt.-%, like in the range of 10 to 60 wt.-%, preferably in the range of 20 to 45 wt.-%, more preferably in the range of 25 to 35 wt.-%, based on the total weight of the heterophasic polypropylene (HECO).

The heterophasic polypropylene (HECO) may have an intrinsic viscosity (IV) of the xylene cold soluble (XCS) fraction of not more than 4.5 dl/g, preferably not more than 3.5 dl/g, like in the range of 2.0 to 4.5 dl/g, preferably in the range of 2.7 to 3.5 dl/g.

The heterophasic polypropylene (HECO) may have a comonomer content of the xylene cold soluble (XCS) fraction of not more than 65 mol %, preferably not more than 60 mol %, more preferably not more than 55 mol %, like in the range of 30 to 65 mol %, preferably in the range of 40 to 60 mol %, more preferably in the range of 45 to 55 mol %.

Typically the xylene cold insoluble (XCI) fraction of the heterophasic propylene copolymer (HECO) represents the crystalline or semi-crystalline part of the heterophasic propylene copolymer (HECO), i.e. the matrix (M), whereas the xylene cold soluble (XCS) fraction represents the elastomeric part of the heterophasic propylene copolymer (HECO), i.e. the elastomeric copolymer (E).

The matrix (M) content, i.e. the xylene cold insoluble (XCI) content, in the heterophasic propylene copolymer (HECO) is preferably in the range of 60 to 90 wt.-%, more preferably in the range of 65 to 80 wt.-%, based on the weight of the heterophasic propylene copolymer (HECO).

The elastomeric copolymer (E) content, i.e. the xylene cold soluble (XCS) content, in the heterophasic propylene copolymer (HECO) is preferably in the range of 10 to 40 wt.-%, more preferably 20 to 35 wt.-%, based on the weight of the heterophasic propylene copolymer (HECO).

The heterophasic propylene copolymer (HECO) as well as its individual components (matrix and elastomeric copolymer) can be produced by blending different polymer types. However, it is preferred that the heterophasic propylene copolymer (HECO) as well as its individual components (matrix and elastomeric copolymer) are produced in a sequential step process, using reactors in serial configuration and operating at different reaction conditions.

The heterophasic propylene copolymer (HECO) is known in the art and commercially available. A suitable example is EG066AI of Borealis AG.

The Polar Modified Polypropylene (PMP)

In order to achieve an easier and more uniform dispersion of the carbon fibers (CF) in the polymer components; which act in the as a matrix for the carbon fibers (CF) in the polymer composition (PC); a polar modified polypropylene (PMP) is applied as a coupling agent.

The polar modified polypropylene (PMP) preferably is a polypropylene containing polar groups.

In the following the polypropylene will be defined more precisely which is subsequently modified to the polar modified polypropylene (PMP) as explained in detail below.

The polypropylene is preferably a propylene homopolymer or a random propylene copolymer, like a copolymer of (i) propylene and (ii) ethylene and/or $C_4$ to $C_{12}$ α-olefins, preferably from (i) propylene and (ii) an α-olefin selected from the group consisting of ethylene, 1-butene, 1-hexene, 1-octene, and mixtures thereof, preferably ethylene only.

In one embodiment, the modified polypropylene (PMP) is a modified random propylene copolymer, wherein said random propylene copolymer comprises ethylene as the only comonomer unit.

The polypropylene from which the polar modified polypropylene (PMP) is prepared may also be a propylene homopolymer. However, it is preferred that the polypropylene from which the polar modified polypropylene (PMP) is prepared is a random propylene copolymer.

In one embodiment the polypropylene from which the polar modified polypropylene (PMP) is prepared is a random propylene copolymer comprising only comonomer units derived from ethylene.

Concerning the definition of the term "random propylene copolymer" reference is made to the information provided above discussing the polypropylene (PP).

Preferably, the units derivable from propylene constitutes the main part of the random propylene copolymer, i.e. at least 90.0 wt.-%, more preferably in the range of 92.0 to 99.5 wt.-%, even more preferably of 92.5 to 98.0 wt.-%, yet even more preferably of 93.0 to 96.0 wt.-%, based on the total weight of the random propylene copolymer. Accordingly, the amount of units derived from ethylene and/or $C_4$ to $C_{12}$ α-olefins, preferably derived from ethylene, in the random propylene copolymer is at most 10.0 wt.-%, preferably in the range of 0.5 to 8.0 wt.-%, more preferably of 2.0 to 7.5 wt.-%, even more preferably of 4.0 to 7.0 wt.-%, based on the total weight of the random propylene copolymer.

It is in particular appreciated that the random propylene copolymer only comprises units derivable from propylene and ethylene. The comonomer amounts given in this paragraph belong preferably to the random propylene copolymer which is not modified.

It is appreciated that the random propylene copolymer, i.e. the non-modified random propylene copolymer, has a melting temperature $T_m$ in the range of 125 to 140° C., more preferably in the range of 128 to 138° C. even more preferably in the range of 131 to 136° C. The melting temperature given in this paragraph is the melting temperature of the non-modified random propylene copolymer.

It is appreciated that the random propylene copolymer, i.e. the non-modified random propylene copolymer, has a melt flow rate $MFR_2$ (230° C.) measured according to ISO 1133 in the range from 1 to 30 g/10 min, preferably in the range of 1 to 20 g/10 min, more preferably in the range of 1 to 10 g/10 min, and most preferably in the range of 2 to 6 g/10 min.

It is appreciated that the polar modified polypropylene (PMP) comprises groups derived from polar groups. In this context, preference is given to polar modified polypropylene (PMP) comprising groups derived from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar groups are unsaturated cyclic anhydrides and their aliphatic diesters, and the diacid derivatives. In particular, one can use maleic anhydride and compounds selected from $C_{10}$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

In terms of structure, the polar modified polypropylene (PMP) is preferably selected from graft or block copolymers preferably of the above defined polypropylene, like the above defined random propylene copolymer.

Preferably the polar modified polypropylene (PMP), i.e. the coupling agent, is a polypropylene, like the random propylene copolymer as defined above in the section "the polyar modified propylene (PMP) as coupling agent", grafted with such polar group.

Particular preference is given to using a polypropylene, like the random propylene copolymer as defined above in the section "The Polar Modified Propylene (PMP)" grafted with maleic anhydride as the polar modified polypropylene (PMP), i.e. the coupling agent.

In one embodiment, the polar modified polypropylene (PMP) is a random propylene copolymer as defined above grafted with maleic anhydride. Thus in one specific preferred embodiment the polar modified polypropylene (PMP) is a random propylene ethylene copolymer grafted with maleic anhydride, more preferably wherein the ethylene content based on the total amount of the random propylene ethylene copolymer is in the range of 2.0 to 7.5 wt.-%, more preferably in the range of 4.0 to 7.0 wt.-%.

In order to achieve the desired dispersion of the carbon fibers (CF) in the polymer components ensuring that the polymer composition (C) provides the well-balanced mechanical properties, in particular a high impact strength in combination with a high elongation a break at low density, it is appreciated that the polar modified polypropylene (PMP) comprises an amount of groups deriving from polar groups which is higher than that typically used in polar modified polypropylenes considered for polypropylenes.

The polar modified polypropylene (PMP) may comprise groups deriving from polar groups in an amount in the range of 0.5 to 5.0 wt.-%, preferably in the range of 1.0 to 4.0 wt.-%, more preferably in the range of 1.5 to 3.0 wt.-%, even more preferably in the range of 1.7 to 2.3 wt.-%, based on the total weight of the polar modified polypropylene (PMP).

The polar modified polypropylene (PMP) may have a melt flow volume rate MVI (170° C.; 1.2 kg) measured according to ISO 1133 in the range of 20 to 150 cm³/10 min, preferably in the range of 40 to 100 cm³/10 min.

In one embodiment the polar modified polypropylene (PMP) is a random propylene ethylene copolymer grafted with maleic anhydride with an ethylene content based on the total amount of the random propylene ethylene copolymer is in the range of 2.0 to 7.5 wt.-%, having groups deriving from polar groups in an amount in the range of 0.5 to 5.0 wt.-% and a melt flow volume rate MVI (170° C.; 1.2 kg) measured according to ISO 1133 in the range of 20 to 150 cm³/10 min.

In one embodiment the polar modified polypropylene (PMP) is a random propylene ethylene copolymer grafted with maleic anhydride with an ethylene content based on the total amount of the random propylene ethylene copolymer is in the range of 2.0 to 3.0 wt.-%, having groups deriving from polar groups in an amount in the range of 1.5 to 3.0 wt.-% and a melt flow volume rate MVI (170° C.; 1.2 kg) measured according to ISO 1133 in the range of 40 to 100 cm³/10 min.

In one embodiment the polar modified polypropylene (PMP) is a random propylene ethylene copolymer grafted with maleic anhydride with an ethylene content based on the total amount of the random propylene ethylene copolymer is in the range of 2.0 to 2.8 wt.-%, having groups deriving from polar groups in an amount in the range of 1.7 to 2.3 wt.-% and a melt flow volume rate MVI (170° C.; 1.2 kg) measured according to ISO 1133 in the range of 40 to 100 cm$^3$/10 min.

Additionally or alternatively, it is appreciated that the polar modified polypropylene (PMP) preferably has a melting temperature T$_m$ in the range of 120 to 150° C., more preferably ranges from 125 to 145° C. and most preferably ranges from 130 to 140° C.

The polar modified polypropylene (PMP) can be produced in a simple manner by a two-step grafting process comprising a solid stage as a first step and a melt stage as a second step. Such process steps are well known in the art.

The polar modified polypropylene (PMP) is known in the art and commercially available. A suitable example is SCONA TSPP 10213 GB of BYK.

The polymer composition (PC) may comprise the polar modified polypropylene (PMP) in an amount in the range of 2.5 to 10 parts per weight, preferably in the range of 3.0 to 7.0 parts per weight, more preferably in the range of 3.0 to 6.0 parts per weight, based on the total parts by weight of polypropylene (PP), polar modified polypropylene (PMP) and carbon fibers (CF).

In one embodiment the polymer composition (PC) comprises the polar modified polypropylene (PMP) in an amount in the range of 2.5 to 10 parts per weight, based on the total parts by weight of polypropylene (PP), polar modified polypropylene (PMP) and carbon fibers (CF).

In one embodiment the polymer composition (PC) comprises the polar modified polypropylene (PMP) in an amount in the range of 3.0 to 6.0 parts per weight, based on the total parts by weight of polypropylene (PP), polar modified polypropylene (PMP) and carbon fibers (CF).

The polymer composition (PC) may comprise the polar modified polypropylene (PMP) in an amount of at least 2.5 wt.-%, preferably at least 3.0 wt.-%, like an amount in the range of 2.5 to 10 wt.-%, preferably in the range of 3.0 to 7.0 wt.-%, based on the total weight of the polymer composition (PC).

In one embodiment the polymer composition (PC) comprises the polar modified polypropylene (PMP) in an amount in the range of 2.5 to 10 wt.-%, based on the total weight of the polymer composition (PC).

In one embodiment the polymer composition (PC) comprises the polar modified polypropylene (PMP) in an amount in the range of 3.0 to 6.0 parts per weight, based on the total weight of the polymer composition (PC).

Preferably the polar modified polypropylene (PMP) is the only polar modified polypropylene present in the polymer composition (PC). In one embodiment the polar modified polypropylene (PMP) is the only polar modified polypropylene present in the polymer composition (PC).

The Carbon Fibers (CF)

It is appreciated that the polypropylene composition (C) shall have well-balanced mechanical properties, in particular a high impact strength in combination with a high elongation a break. In order to achieve these properties it is an essential requirement to include carbon fibers (CF).

The carbon fibers (CF) may have an average diameter in the range of 2 to 30 μm, preferably in the range of 3 to 25 μm, more preferably in the range of 5 to 20 μm The carbon fibers (CF) may have a density in the range of 1.0 to 2.5 g/cm$^3$, preferably in the range of 1.5 to 2.3 g/cm$^3$, more preferably in the range of 1.7 to 2.0 g/cm$^3$.

It should be noted that the carbon fibres are not considered to be a polymeric material. Furthermore, the carbon fibers (CF) are not regarded as being encompassed by the term "additives (AD)" as defined in more detail below.

The carbon fibers (CF) may be in the form of a non-woven fabric. The non-woven fabric preferably comprises at least 50 wt.-% carbon fibers (CF), more preferably at least 65 wt.-% carbon fibers, even more preferably at least 75 wt.-% carbon fibers (CF) and most preferably at least 80 wt.-%, based on the total weight of the non-woven fabric.

The non-woven fabric according to the invention may comprise polymeric compounds such as sizing agents and/or sewing threads. It is appreciated that the sizing agents and/or sewing threads are not comprised in an amount exceeding 10 wt.-%, preferably 7.5 wt.-% even more preferably 3 wt.-%, based on the weight of the carbon fiber (CF). Sizing agents and/or sewing threads are considered as being encompassed by the term "carbon fiber (CF)" and do not resemble further polymer compounds.

If present, the amount of sewing thread is normally within the range of 0.25 to 10 wt.-%, preferably within the range of 0.5 to 7.5 wt.-% and most preferably within the range of 1.0 to 3.0 wt.-% based on the total weight of the non-woven fabric. Suitable sewing threads are for example polyester fibers. As indicated above, a sewing threads are considered as being encompassed by the term "carbon fiber (CF)" and do not resemble further polymer compounds.

If present, the amount of sizing agent is typically within the range of 0.25 to 15 wt.-%, preferably 0.5 to 10 wt.-%, more preferably 1.0 to 7.5 wt.-%, based on the weight of the carbon fibers (CF). Suitable sizing agents are for example epoxy resins, polyether-modified epoxy resins, polyurethane, amino-silane grafted polypropylene. As indicated above, sizing agents are considered as being encompassed by the term "carbon fiber (CF)" and do not resemble further polymer compounds.

It is appreciated that the non-woven fabric may be a recycled material which may contain additional compounds besides the carbon fibers, such as minor amounts of glass fiber, depending on the first use. These additional compounds are considered as being encompassed by the term "carbon fiber (CF)" and do not resemble further compounds, in particular no further polymer compounds and/or fiber compounds.

It is appreciated that these additional compounds, such as glass fiber, are not comprised in an amount exceeding 10 wt.-%, preferably 5 wt.-% even more preferably 3 wt.-%, based on the weight of the carbon fiber (CF). In one embodiment the carbon fiber (CF) does not comprise glass fibers in an amount exceeding 5 wt.-%, based on the weight of the carbon fiber (CF). In one embodiment the carbon fiber (CF) does not comprise glass fibers.

In case the carbon fibers (CF) are in the form of a non-woven fabric, the non-woven fabric is preferably in the form of a stripe.

Usually the width of the stripe is not more than 300 mm Preferably the stripe has a width of 10 to 300 mm, preferably a width of 25 to 250 mm and most preferably a width of 40 to 200 mm Additionally or alternatively, the stripe preferably has a length of at least 50 cm, more preferably of at least 150 cm, and most preferably of at least 250 cm.

The stripe may be in the form of a reel. Thus, the length is not particularly limited. However, the length is not particularly limited, i.e. the stripe may be a so-called "endless stripe".

The average weight of the non-woven fabric is preferably within the range of 100 to 1000 g/m$^2$, more preferably within the range of 150 to 800 g/m$^2$ and most preferably within the range of 250 to 650 g/m$^2$.

The non-woven fabric is further characterised by a constant weight per area. Thus, the difference in weight between two sections of the non-woven fabric having an identical area expressed as the quotient of the section having the higher weight to the section having the lower weight is preferably within 10%, more preferably within 5%.

The preparation of non-woven fabric from carbon fibers (CF), e.g. rovings, or recycled material which may be in the form of a laid web, is well-known in the art. Suitable processes are, for example needle punching.

Preferably, the non-woven fabric is in the form of a non-woven fabric, preferably obtained by needle-punching.

The polymer composition (PC) may comprise the carbon fibers (CF) in an amount of 2.5 to 35 parts per weight, preferably in an amount of 5.0 to 30 parts per weight, more preferably in the range of 10 to 25 parts per weight, even more preferably in the range of 17 to 23 parts per weight, based on the total parts by weight of polypropylene (PP), polar modified polypropylene (PMP) and carbon fibers (CF).

In one embodiment the polymer composition (PC) comprises the carbon fibers (CF) in an amount in the range of 2.5 to 45 parts per weight, based on the total parts by weight of polypropylene (PP), polar modified polypropylene (PMP) and carbon fibers (CF).

In one embodiment the polymer composition (PC) comprises the carbon fibers (CF) in an amount in the range of 17 to 23 parts per weight, based on the total parts by weight of polypropylene (PP), polar modified polypropylene (PMP) and carbon fibers (CF).

The polymer composition (PC) may comprise the carbon fibers (CF) in an amount of at least 2.5 wt.-%, preferably at least 5.0 wt.-%, more preferably at least 10 wt.-%, even more preferably at least 17 wt.-%, like an amount in the range of 2.5 to 45 wt.-%, preferably in the range of 5.0 to 30 wt.-%, even more preferably in the range of 10 to 25.0 wt.-%, yet even more preferably in the range of 17 to 23 wt.-%, based on the total weight of the polymer composition (PC).

In one embodiment the polymer composition (PC) comprises the carbon fibers (CF) in an amount in the range of 2.5 to 45 wt.-%, based on the total weight of the polymer composition (PC).

In one embodiment the polymer composition (PC) comprises the carbon fibers (CF) in an amount in the range of 17 to 23 parts per weight, based on the total weight of the polymer composition (PC).

Preferably the carbon fibers (CF) are the only fibers present in the polymer composition (PC). In one embodiment the polymer composition (PC) does not comprise fibers selected from the group consisting of glass fibers, metal fibers, mineral fibers, ceramic fibers and mixtures thereof. In one embodiment the polymer composition (PC) does not comprise fibers obtained from an inorganic material.

The Additives (AD)

In addition to the polypropylene (PP), the polar modified polypropylene (PMP) and the carbon fibers (CF) the polymer composition (PC) may comprise additives (AD).

Typical additives are acid scavengers, antioxidants, colorants, light stabilisers, plasticizers, slip agents, anti-scratch agents, dispersing agents, processing aids, lubricants, pigments, antistatic agent, and the like.

Such additives are commercially available and for example described in "Plastic Additives Handbook", 6$^{th}$ edition 2009 of Hans Zweifel (pages 1141 to 1190).

As indicated above the term "additives (AD)" does not include fibers, such as carbon fibers, glass fibers, metal fibers, mineral fibers and ceramic fibers. In other words, the carbon fibers (CF) are not regarded as an additive.

However, the term "additives (AD)" may also include carrier materials, in particular polymeric carrier materials (PCM).

The polymer composition (PC) may comprise the additives (AD) in an amount of up to 10 wt.-%, preferably in an amount in the range of 0.01 to 10 wt.-%, more preferably in an amount in the range of 0.05 to 5 wt.-%, even more preferably in an amount in the range of 0.1 to 2.5 wt.-%, based on the weight of the polymer composition (PC).

The polymer composition (PC) may comprise additives selected from the group of antioxidant, acid scavenger, anti-scratch agent, mould-release agent, lubricant, UV stabiliser and mixtures thereof.

The additives (AD) may be included into the polymer composition (PC) as a separate ingredient. Alternatively, the additives (AD) may be included into the polymer composition (PC) together with at least one other component. For example the additives (AD) may be added to the polymer composition (PC) together the polypropylene (PP), the polar modified polypropylene (PMP) and/or the carbon fibers (CF), preferably in form of a master batch (MB). Hence, terms "polypropylene (PP)", "polar modified polypropylene (PMP)" and "carbon fibers (CF)" may be directed at a composition including additives (AD). Additives other than the polymeric carrier materials (PCM) are typically added to the polymer composition (PC) together with polymeric carrier materials (PCM) in form of a master batch (MB).

Thus, a polymer composition (PC) consisting of the polypropylene (PP), the polar modified polypropylene (PMP) and the carbon fibers (CF) may also comprise additives (AD).

The Polymeric Carrier Material (PCM)

As indicated above, in a preferred embodiment the polymer composition (PC) does not comprise other polymers besides the polypropylene (PP) and the polar modified polypropylene (PMP) in an amount exceeding 10 wt.-%, preferably in an amount exceeding 5 wt.-%, more preferably in an amount exceeding 2.5 wt.-%, even more preferably in an amount exceeding 0.8 wt.-%, based on the weight of the polymer composition (PC). If an additional polymer is present, such a polymer is typically a polymeric carrier material (PCM) for additives.

The polymeric carrier material (PCM) is a carrier polymer for the other additives to ensure a uniform distribution in the polymer composition (PC). The polymeric carrier material (PCM) is not limited to a particular polymer. The polymeric carrier material (PCM) may be ethylene homopolymer, ethylene copolymer obtained from ethylene and α-olefin comonomer such as $C_3$ to $C_8$ α-olefin comonomer, propylene homopolymer, propylene copolymer obtained from propylene and α-olefin comonomer such as ethylene and/or $C_4$ to $C_8$ α-olefin comonomer and mixtures thereof.

Typically the polymeric carrier material (PCM) as such does not contribute to the improved properties of the polymer composition (PC) described.

The Article

The present invention is further directed at an article comprising the polymer composition (PC).

The article may comprise the polymer composition (PC) in an amount of at least 80 wt.-%, like 80 to 99.9 wt.-%, preferably in an amount of at least 90 wt.-%, like 90 to 99.9 wt.-%, more preferably in an amount of at least 95 wt.-%, like 95 to 99.9 wt.-%.

The article may be a molded article or an extruded article, preferably the article is a molded article, like an injection molded article or a compression molded article.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy is used to quantify the isotacticity and regio-regularity of the polypropylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For polypropylene homopolymers approximately 200 mg of material was dissolved in 1,2-tetrachloroethane-$d_2$ (TCE-$d_2$). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C\{^1H\}$ NMR spectra were processed, integrated and relevant quantitative properties determined from the integrals using proprietary computer programs.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2.1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2.1 erythro regio-defects was quantified using the average integral of the two characteristic methyl sites at 17.7 and 17.2 ppm:

$P_{21e} = (I_{e6} + I_{e8})/2$

The amount of 1.2 primary inserted propene was quantified based on the methyl region with correction undertaken for sites included in this region not related to primary insertion and for primary insertion sites excluded from this region:

$P_{12} = I_{CH3} + P_{12e}$

The total amount of propene was quantified as the sum of primary inserted propene and all other present regio-defects:

$P_{total} = P_{12} = P_{21e}$

The mole percent of 2.1-erythro regio-defects was quantified with respect to all propene:

$[21e]mol.-\% = 100*(P_{21e}/P_{total})$

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction.

The weight percent comonomer incorporation was calculated from the mole fraction.

The xylene Cold Solubles (XCS) are measured at 25° C. according ISO 16152; first edition; 2005 Jul. 1.

The Intrinsic Viscosity is measured according to DIN ISO 1628/1, October 1999 (in Decalin at 135° C.).

The Tensile Modulus (TM) is measured according to ISO 527-2 (cross head speed=1 mm/min; 23° C.) using injection molded specimens as described in EN ISO 1873-2 (dog bone shape, 4 mm thickness).

The Tensile Strength (TS) and the Tensile Elongation at Break (TE) are measured according to ISO 527-2 (cross head speed=50 mm/min; 23° C.) using injection molded specimens as described in EN ISO 1873-2 (dog bone shape, 4 mm thickness).

The Flexural Modulus was determined in 3-point-bending according to ISO 178 on injection molded specimens of 80×10×4 mm prepared in accordance with ISO 294-1:1996.

The Charpy Impact Strength (IS) is determined according to ISO 179 1 eU at 23° C. by using an 80×10×4 mm³ test bars injection molded in line with EN ISO 1873-2.

The Charpy Notched Impact Strength (NIS) is determined according to ISO 179 1 eA at 23° C. by using an 80×10×4 mm³ test bars injection molded in line with EN ISO 1873-2.

The Average Fiber Diameter is determined according to ISO 1888:2006(E), Method B, microscope magnification of 1000.

The Melt Flow Rate (MFR$_2$) is measured according to ISO 1133 at the temperature and load given.

The Melt Flow Volume Rate (MVI) is measured according to ISO 1133 at the temperature and load given.

The Heat Deformation Temperature (HDT) is determined according to ISO 75-2 using a Ceast 6921 of Instron® GmbH, Germany.

The Density is measured according to ISO 1183-187. Sample preparation is done by compression molding in accordance with ISO 1872-2:2007.

The DSC Analysis, Melting Temperature (Tm) and Melting Enthalpy (Hm), Crystallization Temperature (Tc) and Crystallization Enthalpy (Hc) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and crystallization enthalpy (Hc) are determined from the cooling step, while melting temperature and melting enthalpy (Hm) are determined from the second heating step.

The Injection Pressure (INJP) is measured during the injection moulding of the specimens used to determine the flow marks as described below with respective process conditions on an Engel ES 1350/350 HL injection molding apparatus.

The Flow Marks

The tendency to show flow marks was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:

1. Image Recording:

The basic principle of the measurement system is to illuminate the plates with a defined light source (LED) in a closed environment and to record an image with a CCD-camera system.

Figure 1:
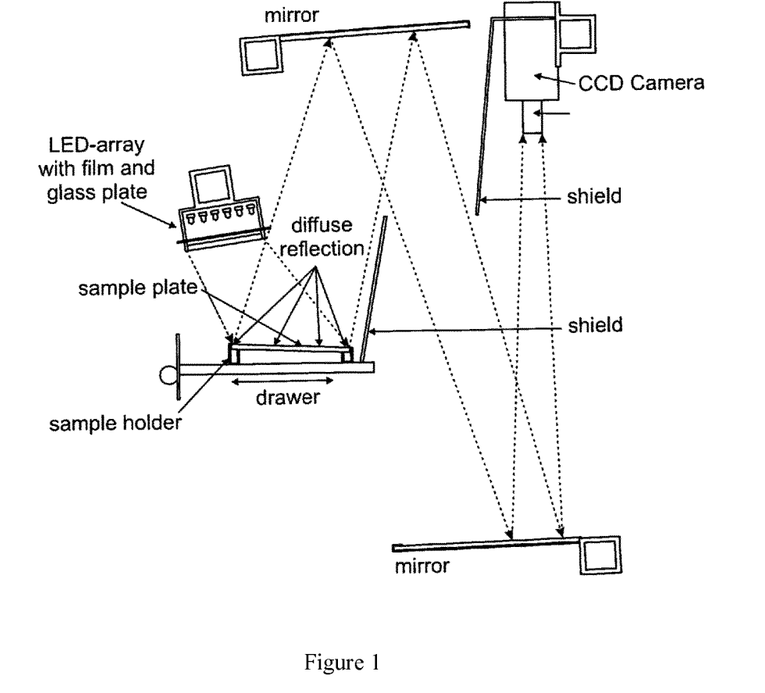
FIG. 1 illustrates a schematic setup for imaging recording with a CCD-camera system.
Figure 2:
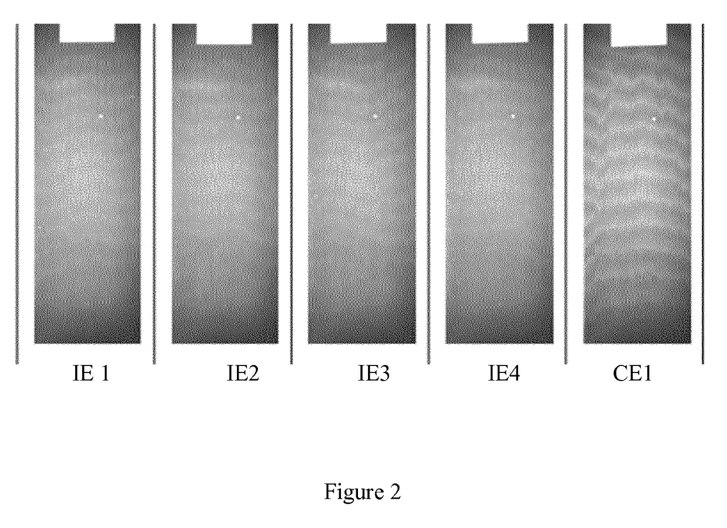
FIG. 2 shows the images recorded by a CCD-camera system of evaluation plaques (440×148×2.8 mm) with a grain VW K50 and a filmgate of 1.4 mm using a filling time of 3 sec.

A schematic setup is given in FIG. 1.

2. Image Analysis

The specimen is floodlit from one side and the upwards reflected portion of the light is deflected via two mirrors to a CCD-sensor. The accordingly created grey value image is analyzed in lines. From the recorded deviations of grey values the mean square error (MSE) is calculated allowing a quantification of surface quality, i.e. the larger the MSE value the more pronounced is the surface defect.

Generally, for one and the same material, the tendency to flow marks increases when the injection speed is increased.

For this evaluation plaques 440×148×2.8 mm with grain VW K50 and a filmgate of 1.4 mm were used and were produced with a filling time of 3 sec.

Further Conditions:

Melt temperature: 240° C.

Mould temperature 40° C.

Dynamic pressure: 10 bar hydraulic

The smaller the MSE value is at a certain filling time, the smaller is the tendency for flow marks.

Process Conditions:

Melt temperature: 240° C.

Mould temperature 40° C.

Dynamic pressure: 10 bar hydraulic.

2. Examples

The present invention is illustrated by the following examples:

The Inventive Examples IE1 to IE4 are prepared by melt blending with a twin-screw extruder such as the Coperion STS-35 twin-screw extruder from the Coperion (Nanjing) Corporation, China. The twin-screw extruder runs at an average screw speed of 400 rpm with a temperature profile of zones from 180 to 250° C.

The Inventive Example IE1 and the Comparative Examples CE1 and CE 2 are based on the recipe summarized in Tables 2.

TABLE 1

The recipe for preparing the inventive and comparative compositions

| Example | | IE1 | IE2 | IE3 | IE4 |
|---|---|---|---|---|---|
| PPH-1 | [wt. %]* | 10 | 10 | 10 | 10 |
| PPH-2 | [wt. %]* | 54.85 | 44.85 | 44.85 | 24.85 |
| PPH-3 | [wt. %]* | 10 | 10 | 10 | 10 |
| Elastomer-1 | [wt. %]* | | 10 | | |
| Elastomer-2 | [wt. %]* | | | 10 | |
| HECO | [wt. %]* | | | | 30 |
| PMP | [wt. %]* | 5.0 | 5.0 | 5.0 | 5.0 |
| CF | [wt. %]* | 20 | 20 | 20 | 20 |

*rest to 100 wt.-% are additives in regular levels, including polymeric carrier material, antioxidants, and UV-stabilizer, such as pentaerythrityl-tetrakis(3-(3',5'-di-tert. butyl-4-hydroxyphenyl)-propionate in form of the commercial antioxidant "Irganox 1010" of BASF, Germany, CAS-no. 6683-19-8; and tris(2,4-di-t-butylphenyl) phosphite in form of the commercial antioxidant "Irgafos 168 FF " of BASF, Germany, CAS-no. 31570-04-4.

"PPH-1" is the commercial product HF955MO of Borealis AG, which is a propylene homopolymer having a melt flow rate MFR$_2$ (230° C., 2.16 kg) of 20 g/10 min and a density of 908 kg/m³. The propylene homopolymer HF955MO is α-nucleated with polyvinyl cyclohexane.

"PPH-2" is the commercial product HJ120UB of Borealis AG, which is a propylene homopolymer having a melt flow rate MFR$_2$ (230° C., 2.16 kg) of 75 g/10 min and a density of 905 kg/m³.

"PPH-3" is the commercial product HL504FB of Borealis AG, which is a propylene homopolymer having a melt flow rate MFR$_2$ (230° C., 2.16 kg) of 450 g/10 min.

"Elastomer-1" is the commercial product Queo8201 of Borealis AG, which is an ethylene/1-octene copolymer having a melt flow rate MFR$_2$ (190° C., 2.16 kg) of 1.1 g/10 min and a density of 883 kg/m³.

"Elastomer-2" is the commercial product Queo8230 of Borealis AG, which is an ethylene/1-octene copolymer having a melt flow rate MFR$_2$ (190° C., 2.16 kg) of 30 g/10 min and a density of 882 kg/m³.

"PMP" is the commercial product SCONA TSPP10213GB of Co. Ltd, Germany, which is a polypropylene functionalized maleic acid anhydride having an MVR (170° C., 1.2 kg) of 40 to 100 cm³/10 min and a maleic acid anhydride content of 2.0 wt.-%.

"CF" is the commercial product RECATEX C90 of SGL Carbon SE, which is a non-woven fabric comprising 90 wt.-% carbon fiber having a density determined according to ISO 10119: 2002 of 1.8 g/nf and a tensile strength determined according to ISO 10618: 2004 of 4400.

The properties of the inventive examples IE1 to IE4 and the comparative example CE1 are summarized in Table 2.

TABLE 2

The properties of the inventive and comparative compositions (ranges of claim 1 also given)

| Example | | IE1 | IE2 | IE3 | IE4 | CE1 | Claim 1 |
|---|---|---|---|---|---|---|---|
| Tensile Modulus (TM) | [MPa] | 10534 | 9302 | 9105 | 9654 | 9759 | 8500 to 11500 |
| Tensile Strength (TS) | [MPa] | 104 | 90 | 88 | 93 | 90 | |
| Tensile Elongation (TE) | [%] | 2.4 | 2.7 | 3.4 | 2.5 | 2.7 | 2.0 to 5.0 |
| Charpy Impact Strength (IS) | [kJ/m$^2$] | 35 | 38 | 43 | 36 | 43 | 30 to 50 |
| Melt Flow Rate (MFR$_2$) | [g/10 min] | 37 | 23 | 36 | 29 | 6.9 | 20 to 30 |
| Flexural Modulus (FM) | [MPa] | 8571 | 7855 | 7450 | 7952 | | |
| Injection Pressure (INJP) | [bar] | 51 | 59 | 53 | 58 | 85 | |
| Heat Deformation Temperature (HDT) | [° C.] | 159 | 158 | 158 | 159 | | |
| MSE (filling time 3 s) | | <20 | <20 | <20 | <20 | >20 | |

The invention claimed is:

1. A polymer composition (PC) having:
a melt flow rate MFR$_2$ (230° C., 2.16 kg) measured according to ISO 1133 in the range of 20 to 30 g/10 min,
a tensile modulus measured according to ISO 527-2 in the range of 8500 to 11500 MPa,
a Charpy Impact Strength measured according to ISO 179-1 eU:2000 at 23° C. in the range of 30 to 50 kJ/m$^2$ and
a tensile elongation at break measured according to ISO 527-2 in the range of 2.0 to 5.0% comprising:
(a) 55 to 95 parts per weight of a polypropylene composition (PP);
(b) 2.5 to 10 parts per weight of a polar modified polypropylene (PMP);
(c) 2.5 to 35 parts per weight of carbon fibers (CF);
based on the total parts by weight of compounds (a), (b) and (c),
wherein the polypropylene composition (PP) comprises:
(a1) a first propylene homopolymer (PPH-1); and/or
(a2) a second propylene homopolymer (PPH-2); and/or
(a3) a third propylene homopolymer;
wherein:
(i) the propylene homopolymer (HPP-1) has a melt flow rate MFR$_2$ (230° C., 2.16 kg) measured according to ISO 1133 in the range of 1.0 to 45 g/10 min; and/or
(ii) the propylene homopolymer (HPP-2) has a melt flow rate MFR$_2$ (230° C., 2.16 kg) measured according to ISO 1133 in the range of 50 to 190 g/10 min; and/or
(iii) the propylene homopolymer (HPP-3) has a melt flow rate MFR$_2$ (230° C., 2.16 kg) measured according to ISO 1133 in the range of 200 to 800 g/10 min.

2. The polymer composition (PC) according to claim 1, wherein the polypropylene (PP) comprises:
(a1) 2.5 to 22.5 parts per weight of the propylene homopolymer (HPP-1) having a melt flow rate MFR$_2$ (230° C., 2.16 kg) measured according to ISO 1133 in the range of 1.0 to 45 g/10 min;
(a2) 55 to 95 parts per weight of the propylene homopolymer (HPP-2) having a melt flow rate MFR$_2$ (230° C., 2.16 kg) measured according to ISO 1133 in the range of 50 to 190 g/10 min; and
(a3) 2.5 to 22.5 parts per weight of the propylene homopolymer (HPP-3) having a melt flow rate MFR$_2$ (230° C., 2.16 kg) measured according to ISO 1133 in the range of 200 to 800 g/10 min;
based on the total parts by weight of compounds (a1), (a2) and (a3).

3. The polymer composition (PC) according to claim 1, wherein the polypropylene (PP) comprises a random ethylene copolymer (RPE).

4. The polymer composition (PC) according to claim 1, wherein the polypropylene (PP) comprises:
(b1) 6 to 19 parts per weight of the propylene homopolymer (HPP-1) having a melt flow rate MFR$_2$ (230° C., 2.16 kg) measured according to ISO 1133 in the range of 1.0 to 45 g/10 min;
(b2) 43 to 85 parts per weight of the propylene homopolymer (HPP-2) having a melt flow rate MFR$_2$ (230° C., 2.16 kg) measured according to ISO 1133 in the range of 50 to 190 g/10 min;
(b3) 6 to 19 parts per weight of the propylene homopolymer (HPP-3) having a melt flow rate MFR$_2$ (230° C., 2.16 kg) measured according to ISO 1133 in the range of 200 to 800 g/10 min; and
(b4) 6 to 19 parts per weight of a random ethylene copolymer (RPE);
based on the total parts by weight of compounds (b1), (b2), (b3) and (b4).

5. The polymer composition (PC) according to claim 1, wherein the polypropylene (PP) comprises a heterophasic propylene copolymer (HECO).

6. The polymer composition (PC) according to claim 1, wherein the polypropylene (PP) comprises:
(c1) 5 to 25 parts per weight of the propylene homopolymer (HPP-1) having a melt flow rate MFR$_2$ (230° C., 2.16 kg) measured according to ISO 1133 in the range of 1.0 to 45 g/10 min;
(c2) 15 to 50 parts per weight of the propylene homopolymer (HPP-2);
(c3) 5 to 25 parts per weight of the propylene homopolymer (HPP-3) having a melt flow rate MFR$_2$ (230° C., 2.16 kg) measured according to ISO 1133 in the range of 200 to 800 g/10 min; and
(c4) 20 to 60 parts per weight of a heterophasic propylene copolymer (HECO);
based on the total parts by weight of compounds (c1), (c2), (c3), and (c4).

7. The polymer composition (PC) according to claim 1, wherein the polypropylene (PP) and the polar modified polypropylene (PMP) are comprised in an amount of at least 75 wt. %, based on the total weight of the polymer composition (PC).

8. The polymer composition (PC) according to claim 1, wherein the polypropylene (PP), the polar modified polypropylene (PMP) and the carbon fibers (CF) are comprised in an amount of at least 89 wt. %, based on the total weight of the polymer composition (PC).

9. The polymer composition (PC) according to claim 1, wherein the polymer composition (PC) has:
   (a) a tensile strength measured according to ISO 527-2 of at least 60 MPa; and/or
   (b) a flexural modulus measured according to ISO 178 of at least 5000 MPa.

10. The polymer composition (PC) according to claim 1, wherein the polymer composition (PC) does not comprise:
    (a) any other fibers besides the carbon fibers (CF); and/or
    (b) any other polymers besides the polypropylene (PP) and the polar modified polypropylene (PMP).

11. The polymer composition (PC) according to claim 1, wherein the polypropylene (PP) does not comprise any other polymer besides:
    (a) the propylene homopolymer (HPP-1), the propylene homopolymer (HPP-2) and the propylene homopolymer (HPP-3); or
    (b) the propylene homopolymer (HPP-1), the propylene homopolymer (HPP-2), the propylene homopolymer (HPP-3) and the elastomeric copolymer (E); or
    (c) the propylene homopolymer (HPP-1), the propylene homopolymer (HPP-2), the propylene homopolymer (HPP-3) and the heterophasic propylene copolymer (HECO).

12. An article comprising a polymer composition (PC) according to claim 1.

* * * * *